(12) United States Patent
Takanohashi

(10) Patent No.: US 7,048,535 B2
(45) Date of Patent: May 23, 2006

(54) MOLDING MACHINE HAVING A MOVABLE MOLD SUPPORT APPARATUS

(75) Inventor: Ryuichi Takanohashi, Yotsukaido (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 137 days.

(21) Appl. No.: 10/190,513

(22) Filed: Jul. 9, 2002

(65) Prior Publication Data
US 2003/0012842 A1    Jan. 16, 2003

(30) Foreign Application Priority Data
Jul. 13, 2001  (JP) .............................. 2001-212985
Feb. 27, 2002  (JP) .............................. 2002-050676

(51) Int. Cl.
B29C 45/64    (2006.01)

(52) U.S. Cl. .................. 425/593; 425/451.6; 425/472; 425/595

(58) Field of Classification Search ................ 425/593, 425/595, 451.6, 451.9, 472
See application file for complete search history.

(56) References Cited

U.S. PATENT DOCUMENTS

| 5,123,834 | A | * | 6/1992 | Joyner ......................... 425/593 |
| 5,776,402 | A | * | 7/1998 | Glaesener ................... 425/589 |
| 6,027,329 | A | * | 2/2000 | Nazarian et al. ............ 425/589 |
| 6,171,097 | B1 | * | 1/2001 | Urbanek ...................... 425/595 |
| 6,439,876 | B1 | * | 8/2002 | Glaesener ................... 425/595 |
| 2001/0026028 | A1 | | 10/2001 | Nakamoto |

FOREIGN PATENT DOCUMENTS

| DE | 196 08 135 A1 | 9/1997 |
| DE | 198 55 663 A1 | 6/1999 |
| DE | 199 57 485 A1 | 5/2001 |
| EP | 0 747 196 A1 | 12/1996 |
| JP | 4-20422 | 2/1992 |
| JP | 8-258103 | 10/1996 |
| JP | 09-262884 | 10/1997 |
| JP | 10-258451 A | 9/1998 |
| JP | 11-170322 | 6/1999 |
| JP | 2002-192567 A | 10/2002 |

* cited by examiner

Primary Examiner—James P. Mackey
(74) Attorney, Agent, or Firm—Squire, Sanders & Dempsey L.L.P.

(57) ABSTRACT

A molding machine includes a movable mold support apparatus, the movable mold support apparatus including a mold mounting plate, a first load receiving part and a second load receiving part, and a load transmit member having a first end connected to both the first load and the second load receiving parts and a second end connected to a rear surface of the mold mounting plate, wherein a distance between the center of the mold mounting plate and the second end of the load transmit member is shorter than a distance between the center of the mold mounting plate and the first load receiving part and the second load receiving part.

21 Claims, 22 Drawing Sheets

MOLDING MACHINE HAVING A MOVABLE MOLD SUPPORT APPARATUS

BACKGROUND OF THE INVENTION

1. Field of the Invention

The present invention generally relates to molding machines, and more particularly, to a molding machine having a movable mold support apparatus.

2. Description of the Related Art

Generally, there is an injection molding machine, a die-cast machine, an injection sealing press machine or the like in molding machines. For example, in the injection molding machine, resin heated and melted in a heating cylinder is injected into a cavity of a mold apparatus under high pressure so that the cavity is filled with the molten resin. The molten resin is then cooled and solidified so as to obtain a molded article.

The mold apparatus is provided with a stationary mold and a movable mold. The movable mold is advanced and retracted by a mold clamping apparatus, to thereby perform mold closing, mold clamping and mold opening.

The mold clamping apparatus is generally provided with a stationary platen supporting the stationary mold and a movable platen supporting the movable mold.

A toggle mechanism is disposed in the mold clamping apparatus to advance or retract the movable platen and perform the opening and closing of the mold.

The toggle mechanism is operated by driving with an electric motor, a servo motor or the like disposed in a driving part.

FIG. 1 is a first sectional view of a movable platen of a related art injection molding machine. FIG. 2 is a second sectional view of the movable platen of the related art injection molding machine.

Referring to FIG. 1 and FIG. 2, a movable platen 100 includes a plurality of tie bars 107, for example four tie bars. The tie bars 107 are disposed between a stationary platen and a toggle support not shown in FIGS. 1 and 2. The movable platen 100 is disposed as facing the stationary platen and being capable of advancing or retracting (moving rightward and leftward in FIG. 2) along the tie bars 107.

A stationary mold not shown in FIGS. 1 and 2 is disposed on a mold mounting surface of the stationary platen facing the movable platen 100. A movable mold 105 is disposed on a mold mounting surface 110 of a mold mounting plate 101 of the movable platen 100 facing the stationary platen.

A first load receiving part 102 and a second load receiving part 103 are formed at a rear surface, namely a surface opposite the mold mounting surface 110 of the mold mounting plate 101. The first load receiving part 102 has a first pin inserting hole 111 for inserting a toggle pin of an upper side of the toggle mechanism not shown. The second load receiving part 103 has a second pin inserting hole 114 for inserting a toggle pin of a lower side of the toggle mechanism not shown.

The first load receiving part 102 and the second load receiving part 103 are members made of high strength material so that the first load receiving part 102 and the second load receiving part 103 can receive a mold closing force and a mold clamping force for moving the movable platen 100 rightward in FIGS. 1 and 2 by the toggle mechanism. Hence, the first load receiving part 102 and the second load receiving part 103 are formed with the mold mounting plate 101 in a body.

Furthermore, the same number of guide parts 104 each having a guide hole 106 as the number of tie bars 107 are provided at the movable platen 100. The tie bar 107 is inserted into the guide hole 106. A bush 108 which can slide against the tie bar 107 is inserted in each of the guide holes 106. Grease as a lubricant material is received in a gap between the guide hole 106 and the tie bar 107.

When the movable platen 100 is moved forward (rightward in FIG. 2) by the toggle mechanism not shown in FIG. 2, the movable mold 105 is pushed against the stationary mold not shown in FIG. 2 so that mold closing and mold clamping are performed.

The toggle mechanism is disposed to the rearward (leftward in FIG. 2) of the movable platen 100. The toggle mechanism generally includes a toggle lever supported as being capable of swinging against the cross head, another toggle lever supported as being capable of swinging against the toggle support, and a toggle arm supported as being capable of swinging against the movable platen. The toggle lever and the toggle arm are link-connected. The mold clamping force is transmitted to the first load receiving part 102 and the second load receiving part 103 of the movable platen 100 by the above mentioned toggle mechanism. Here, a driving force generated by a driving part such as a motor is multiplied by a toggle ratio, so that the mold clamping force is calculated.

However, the above mentioned and related injection molding machines have the following problems.

Firstly, when the first load receiving part 102 and the second load receiving part 103 receive a strong force from the toggle mechanism for mold clamping and mold closing, the mold mounting plate 101 is bent. As a result, the mold mounting surface 110 of the mold mounting plate 101 may be deformed.

As shown in FIG. 1, the first load receiving part 102 is disposed at the opposite side and higher than the movable mold 105. The second receiving part 103 is disposed at the opposite side and lower than the movable mold 105. FIG. 1 shows a state where the movable mold 105 is pushed to contact the stationary mold not shown in FIG. 1 so that the movable mold 105 cannot be moved. Accordingly, when the first load receiving part 102 and the second load receiving part 103 receive a strong and rightward force from the toggle mechanism, a bending moment is applied to the mold mounting plate 101.

As a result, the mold mounting plate 101 is bent and deformed as shown by one point doted lines in FIG. 1. Therefore, the mold mounting surface 110 is also deformed as shown by additional one point doted lines. Thus, when the mold mounting surface 110 is deformed as shown by additional one point doted line, the movable mold 105 is deformed so that the quality of the molded article is reduced. The deformations of the mold mounting plate 101 and the mounting surface 110 shown in FIG. 1 are drawn with exaggeration in order to explain the deformations.

In order to prevent the mold mounting plate 101 and the mounting surface 110 from deforming, it was attempted in the related art injection molding machine to increase the thickness of the mold mounting plate 101 so that a rigidness of the mold mounting plate 101 would be improved.

However, if the thickness of the mold mounting plate 101 becomes greater, the cost for manufacturing the movable platen 100 becomes high. Furthermore, in this related art case, it is necessary to improve the strength of the entire injection molding machine because weight of the movable platen 100 increases. Therefore, the cost for manufacturing of the entire injection molding machine may become high.

Secondly, in the above mentioned and related art injection molding machines, grease leaking out from the gap between an inner circumferential surface of the bush 108 and an outer circumferential surface of the tie bar 107 may flow downward as shown by an arrow 109. As a result of this, the grease may adhere to the mounting surface 110 or the movable mold 105.

That is to say, as shown in FIG. 2, the grease received in the gap between the guide hole 106 of the guide part 104 and the tie bar 107 may leak out from the gap between the inner circumferential surface of the bush 108 and the outer circumferential surface of the tie bar 107. In this case, if the grease leaks out at the rear surface side of the mold mounting plate 101 and flows downward, the grease drops down without adhering to the mold mounting surface 111 or the movable mold 105. Hence, the above mentioned leaking out of the grease may not be a problem.

However, the grease leaking out to the side of the mold mounting surface 110 adheres to a wide area of the mold mounting surface 110. Hence, there is an extremely high probability that the grease adheres to the movable mold 105. If the grease adhering to the mold mounting surface 110 and the movable mold 105 adheres to the molded article, the quality of the molded article declines. Therefore, the rate of producing low quality molded articles may become high in the above mentioned related art injection molding machine.

SUMMARY OF THE INVENTION

Accordingly, it is a general object of the present invention to provide a novel and useful molding machine in which one or more of the problems described above are eliminated.

Another and more specific object of the present invention is to provide a molding machine having a movable mold support apparatus in which a mold mounting plate can be prevented from being bent and a mold mounting surface of the mold mounting plate can be prevented from being deformed without increasing the thickness of the mold mounting plate. Furthermore, it is also an object of the present invention to provide a molding machine having a movable mold support apparatus in which grease leaking out from a gap between an inner circumferential surface of a bush and an outer circumferential surface of a tie bar can be prevented from adhering to the mold mounting surface and the movable mold.

The above objects of the present invention are achieved by a molding machine having a movable mold support apparatus on which a movable mold is mounted, the movable mold support apparatus moved by a load based on a driving force generated by a driving part, the movable mold support apparatus including, a mold mounting plate having a mold mounting surface on which the movable mold is mounted, a first load receiving part and a second load receiving part that receive the load, and at least one load transmit member having a first end connected to both the first load receiving part and the second load receiving part and a second end connected to a rear surface of the mold mounting plate opposite from the mold mounting surface of the mold mounting plate so that the load received by the first load receiving part and the second load receiving part is transmitted to the rear surface of the mold mounting plate, wherein a first distance in a direction perpendicular to a moving direction of the movable mold support apparatus between a center of the mold mounting plate and a position of the second end of the at least one load transmit member is shorter than a second distance in a direction perpendicular to the moving direction of the movable mold support apparatus between the center of the mold mounting plate and a position of the first end of the at least one load transmit member.

According to the present invention as described above, the load is transmitted to the part in the vicinity of the center of the mold mounting plate and thereby a bending moment against the mold mounting plate becomes small. Hence, even if the thickness of the mold mounting plate is not increased, the mold mounting plate is not bent. Accordingly, the mold mounting plate can be prevented from being bent and the mold mounting surface of the mold mounting plate can be prevented from being deformed without increasing the thickness of the mold mounting plate. The molding machine may be an injection molding machine.

The mold mounting plate may have a designated plate thickness between the mold mounting surface and the rear surface, and the plate thickness at a position of the second end of the at least one load transmit member on the rear surface may be greater than the plate thickness at any other position on the rear surface.

The molding machine may further include a toggle mechanism connected to the movable mold support apparatus and thereby the first load receiving part and the second load receiving part receive the load.

The toggle mechanism may includes a first pin and a second pin that are connected to the movable mold support apparatus, the first load receiving part has a first pin hole where the first pin is inserted, and the second load receiving part has a second pin hole where the second pin is inserted.

The load transmit member may include a first load transmit member and a second load transmit member, and the first load transmit member has a first end connected to the first load receiving part and a second end connected to the rear surface of the mold mounting plate so that the load received by the first load receiving part is transmitted to the rear surface of the mold mounting plate, a first distance in a direction perpendicular to the moving direction of the movable mold support apparatus between the center of the mold mounting plate and a position of the second end of the first load transmit member is shorter than a second distance in a direction perpendicular to the moving direction of the movable mold support apparatus between the center of the mold mounting plate and a position of the first end of the first load transmit member, the second load transmit member has a first end connected to the second load receiving part and a second end connected to the rear surface of the mold mounting plate so that the load received by the second load receiving part is transmitted to the rear surface of the mold mounting plate, and a first distance in a direction perpendicular to the moving direction of the movable mold support apparatus between the center of the mold mounting plate and a position of the second end of the second load transmit member is shorter than a second distance in a direction perpendicular to the moving direction of the movable mold support apparatus between the center of the mold mounting plate and a position of the first end of the second load transmit member.

According to the present invention as described above, the part in the vicinity of the center of the mold mounting plate is not deformed when the load from the first load receiving part and the second load receiving part is transmitted to the rear surface of the mold mounting plate by the load transmit member.

The molding machine may further include a guide member, wherein the movable mold support apparatus further comprises a guide part receiving the guide member so that the movable mold support apparatus slides along the guide member.

The movable mold support apparatus may further include a connecting member having one end connected to the first load receiving part and another end connected to the second load receiving part, and the mold mounting plate, the first load receiving part, the second load receiving part, the at least one load transmit member, the guide part, and the connecting member are formed in a body.

According to the present invention as described above, rigidness of the movable mold support apparatus becomes high so that the mold mounting plate can be prevented from being bent.

The connecting member may have a pipe configuration.

According to the present invention as described above, an apparatus equipped at the rear surface of the mold mounting plate, such as an ejector rod unit or an ejector rod driving part, can be accommodated in a space in the connecting member having the pipe configuration.

The connecting member may have a cross section perpendicular to the moving direction of the movable mold support apparatus, having a substantially rectangular configuration.

According to the present invention as described above, rigidness of the connecting member becomes high and the mold mounting plate is not deformed.

The connecting member may have an end surface facing the mold mounting plate, the end surface being remote from the rear surface of the mold mounting plate.

According to the present invention as described above, it is possible to easily maintain and exchange the apparatus provided at the rear surface of the mold mounting plate and accommodated in the space in the connecting member having the pipe configuration, such as the ejector rod unit or the ejector rod driving part.

The guide member may be a tie bar and the guide part may have a guide hole where the tie bar is inserted.

According to the present invention as described above, the movable mold support apparatus can be advanced and retracted along the tie bar smoothly without disposing additional means for guiding.

The guide member may be a guide rail and the guide part may have a receiving guide receiving the guide rail.

According to the present invention as described above, the movable mold support apparatus can be advanced and retracted along the guide rail smoothly and precision is improved regarding the position of the mold so that it is possible to produce a molded article having high quality. In addition, the grease leaking out from the gap between the outer circumferential surface of the tie bar and the inner circumferential surface of the guide hole can be prevented from adhering to the mold mounting surface and the movable mold mounted on the mold mounting surface.

The guide rail may be a rail of a linear guide way and the receiving guide may be a carriage of the linear guide way.

According to the present invention as described above, the movable mold support apparatus does not totter back and forth or totter right and left. The movable mold support apparatus is advanced or retracted smoothly. Therefore, precision regarding the position of the mold at the time of mold closing, mold clamping, or the like, is improved so that it is possible to produce a molded article having high quality.

The guide part may have an end surface at the mold mounting surface side of the mold mounting plate, the end surface being remote from the position of the mold mounting surface of the mold mounting plate in the direction of the rear surface of the mold mounting plate.

According to the present invention as described above, the grease leaking out can be prevented from flowing down onto the mold mounting surface directly. Therefore, the grease can be prevented from adhering to the mold mounting surface and the movable mold. Hence, a molded article having low quality due to adhesion of the grease to the mold mounting surface and the movable mold is not produced.

The guide part may include a concave part having a bottom surface forming a same surface as the end surface of the guide part and a side surface situated in a direction perpendicular to a direction of the bottom surface. A groove part leading to a side surface of the movable mold may be formed at the side surface of the concave part. A hole part leading from the concave part to the rear surface of the mold mounting plate may be formed at the side surface of the concave part. The side surface may be inclined to an opposite side to the side of the mold mounting surface of the mold mounting plate.

The end surface of the guide part may be situated at a side of the driving part remote from a position of the rear surface of the mold mounting plate, so that a gap is formed between the end surface of the guide part and the rear surface of the mold mounting plate.

According to the present invention as described above, the grease leaking out falls downward from the gap. However, as described later, the grease can be prevented from adhering to the mold mounting surface and the movable mold mounted on the mold mounting surface. Hence, a molded article having low quality due to adhesion of the grease to the mold mounting surface and the movable mold is not produced.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIGS. 3 through 22, of embodiments of the present invention.

Figure 3:
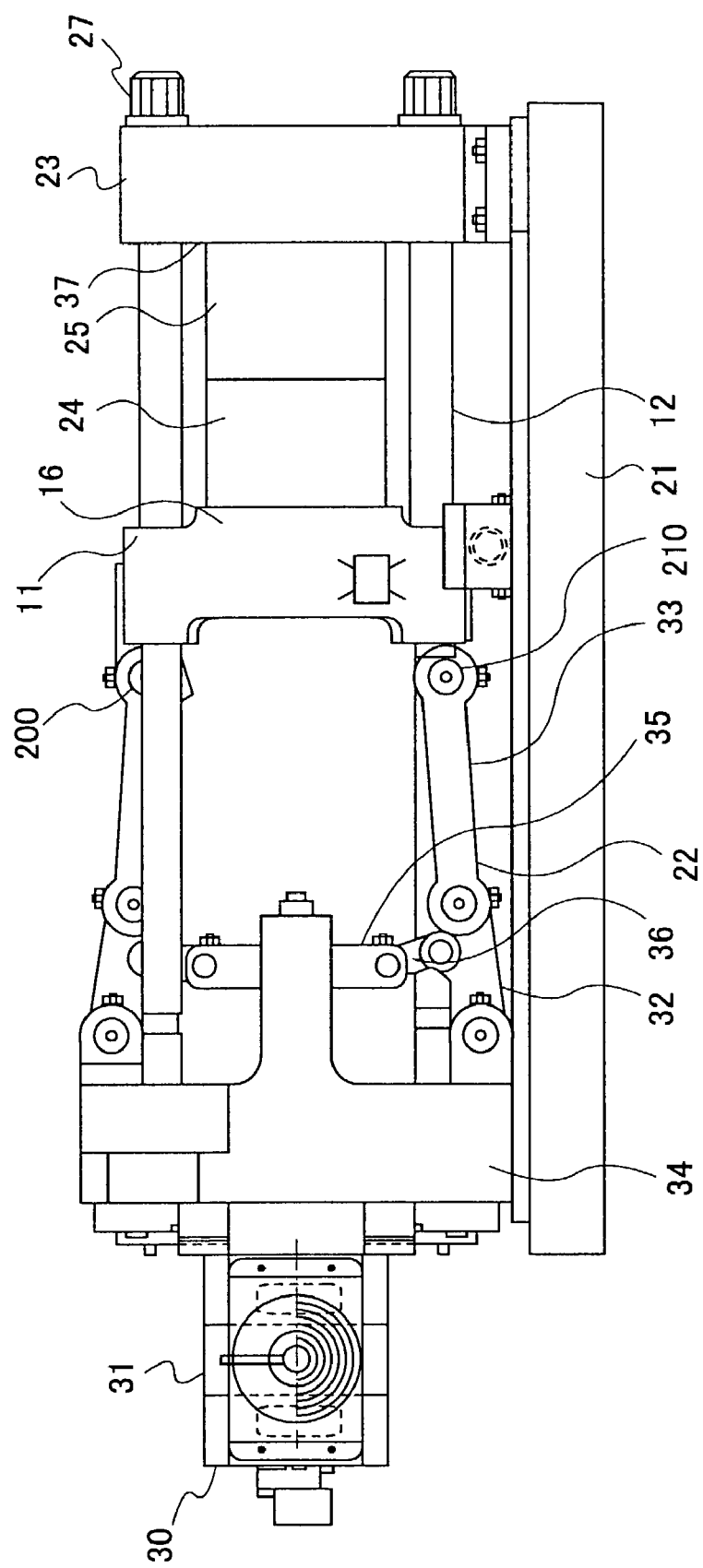
FIG. 3 is a schematic illustration of an injection molding machine of the first embodiment of the present invention.

Firstly, the first embodiment of the present invention will be described. FIG. 3 is a schematic illustration of an injection molding machine of the first embodiment.

Referring to FIG. 3, the injection molding machine of the first embodiment includes a frame 21, a stationary platen 23, and a toggle support 34. The stationary platen 23 is fixed to the frame 21. There is a designated distance between the toggle support 34 and the stationary platen 23. The toggle support 34 works as a base plate disposed as being capable of moving against the frame 21.

The injection molding machine of the first embodiment includes a plurality of tie bars 12, for example four tie bars. The tie bars 12 are disposed between the stationary platen 23 and the toggle support 34 and works as guide members.

The injection molding machine of the first embodiment also includes a movable platen 11.

The movable platen 11 is disposed as facing the stationary platen 23 and works as a movable mold support apparatus disposed as being capable of advancing or retracting (moving rightward and leftward in FIG. 3) along the tie bars 12.

A stationary mold 25 is disposed on a mold mounting surface 37 of the stationary platen 23 facing the movable platen 11. A movable mold 24 is disposed on a mold mounting surface 16 of the movable platen 11 facing the stationary platen 23.

A driving apparatus for moving an ejector pin not shown in FIG. 3 may be disposed at the rear end (the left end in FIG. 3) of the movable platen 11.

A toggle mechanism 22 as a toggle mold clamping apparatus is disposed between the movable platen 11 and the toggle support 34. A driving apparatus 30 as driving means for mold clamping of the injection molding apparatus is disposed at the rear end (the left end in FIG. 3). The driving apparatus 30 has a driving part 31 such as a servo motor so that the cross head 35 as a member driven by the driving part 31 is advanced or retracted, that is, the toggle mechanism 22 is operated.

When the movable platen 11 is advanced (moved rightward in FIG. 3), mold closing is performed. Mold clamping is performed with a mold clamping force. Here, a driving force generated by the driving part 31 is multiplied by a toggle ratio, so that the mold clamping force is calculated. In this embodiment, the mold clamping force is generated by operating the toggle mechanism 22. However, the driving force generated by the driving part 31 may be transmitted directly to the movable platen 11 as a mold clamping force without using the toggle mechanism 22.

The toggle mechanism 22 includes a toggle lever 36 supported as being capable of swinging against the cross head 35, another toggle lever 32 supported as being capable of swinging against the toggle support 34, and a toggle arm 33 supported as being capable of swinging against the movable platen 11. The toggle lever 36 and the toggle lever 32 are link-connected. The toggle lever 32 and the toggle arm 33 are link-connected.

Next, the movable platen 11 will be described.

Figure 4:
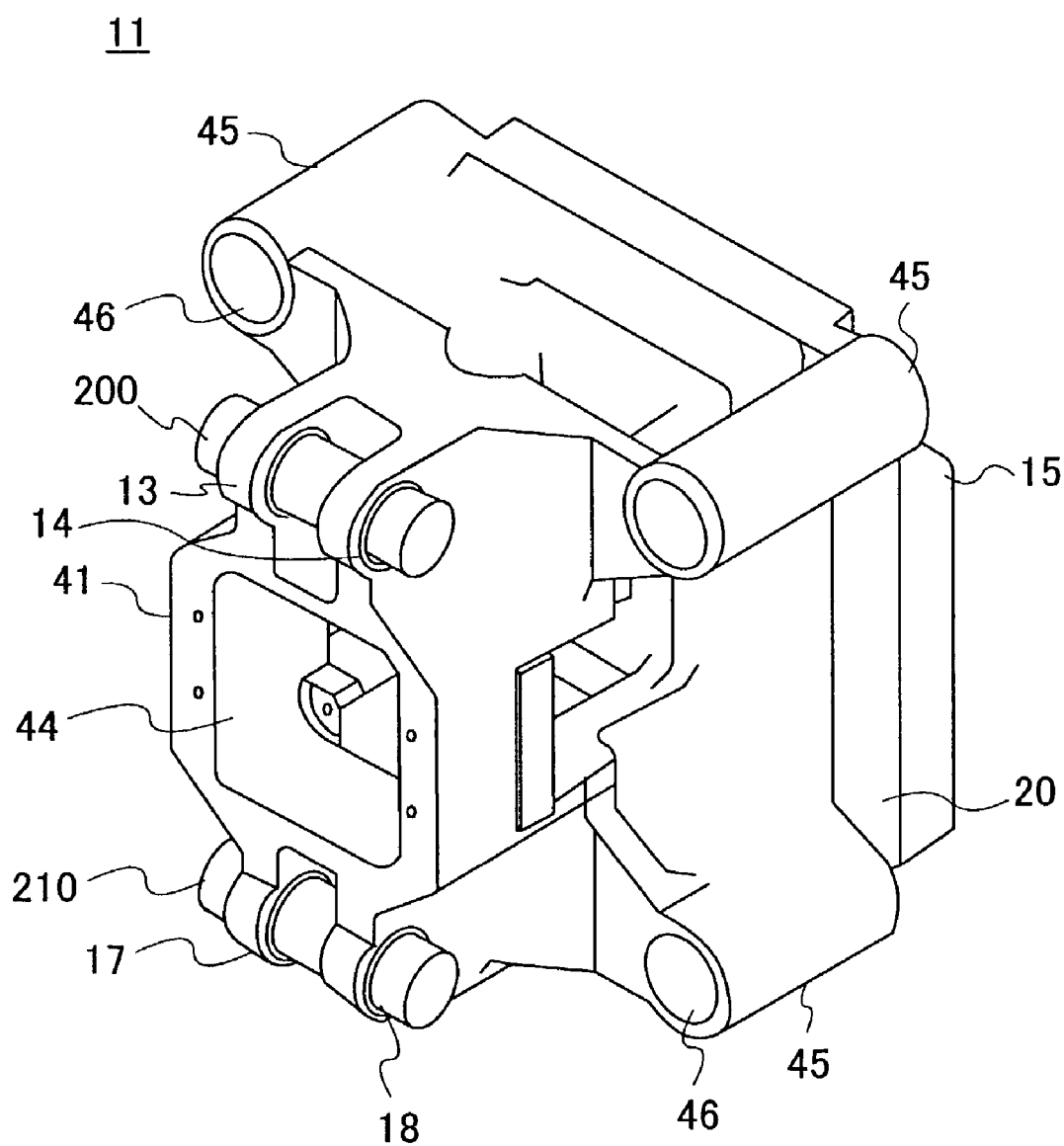
FIG. 4 is a perspective illustration of a movable mold support apparatus of the first embodiment of the present invention.
Figure 5:
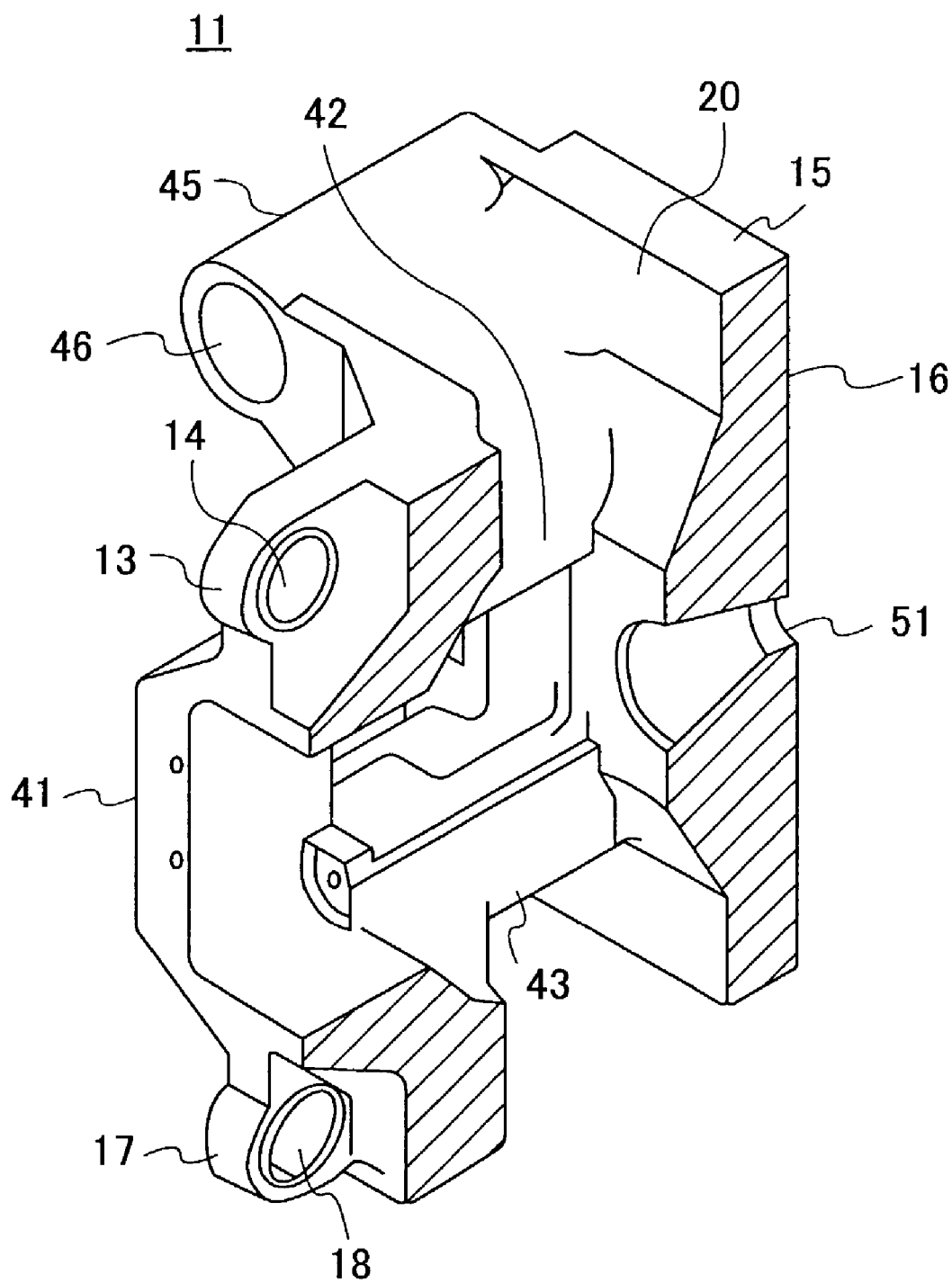
FIG. 5 is a longitudinal section of the movable mold support apparatus shown in FIG. 4 of the first embodiment of the present invention.
Figure 6:
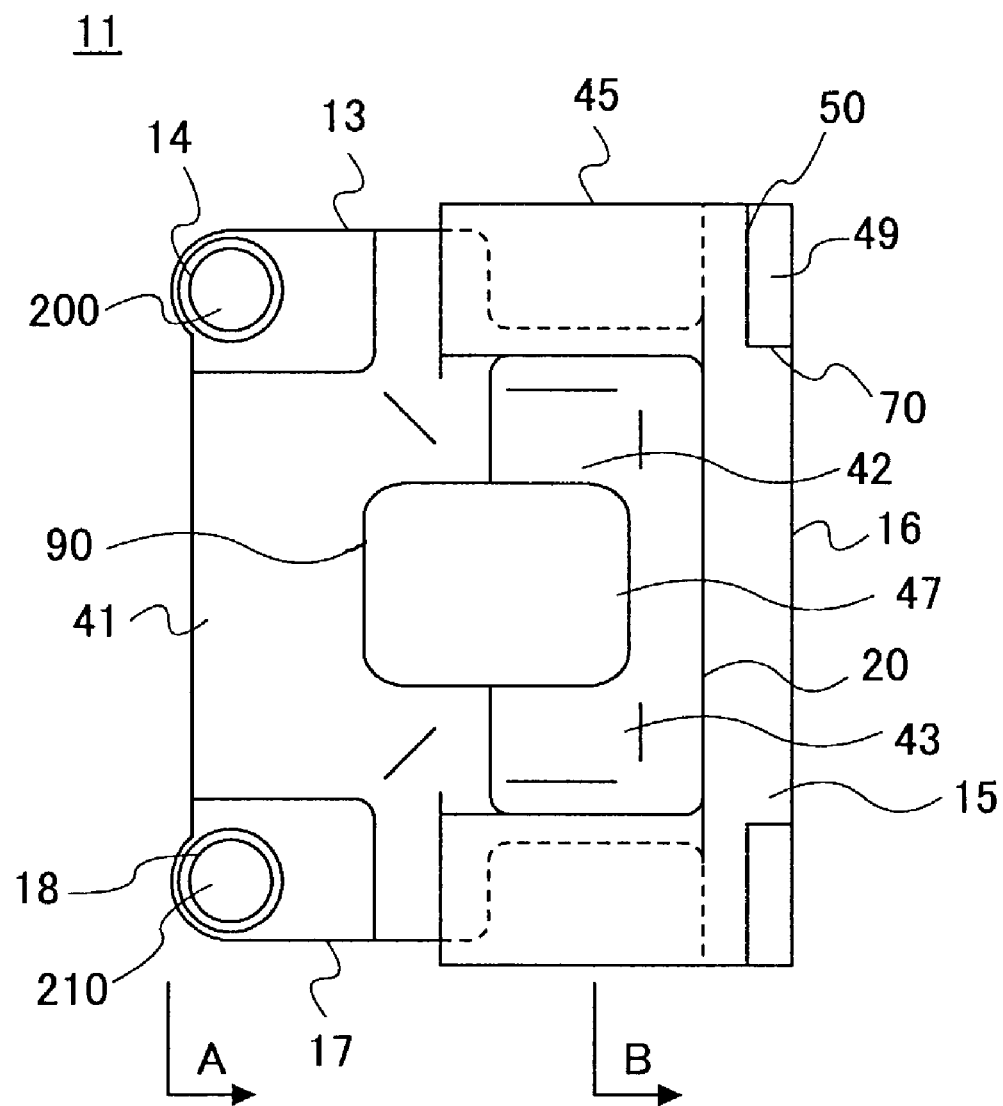
FIG. 6 is a side elevation of the movable mold support apparatus of the first embodiment of the present invention.
Figure 10:
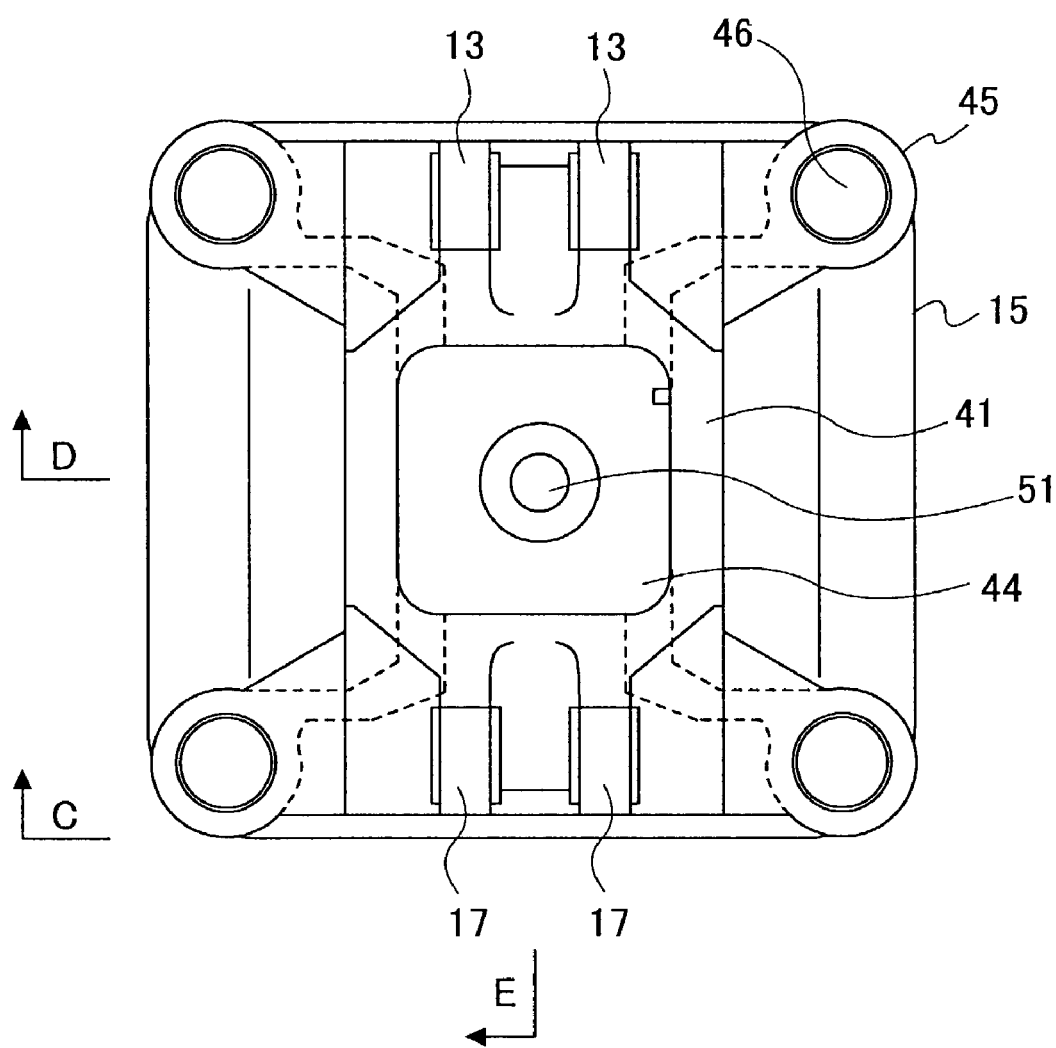
FIG. 10 is a view taken along the arrow A shown in FIG. 6 of the first embodiment of the present invention.
Figure 11:
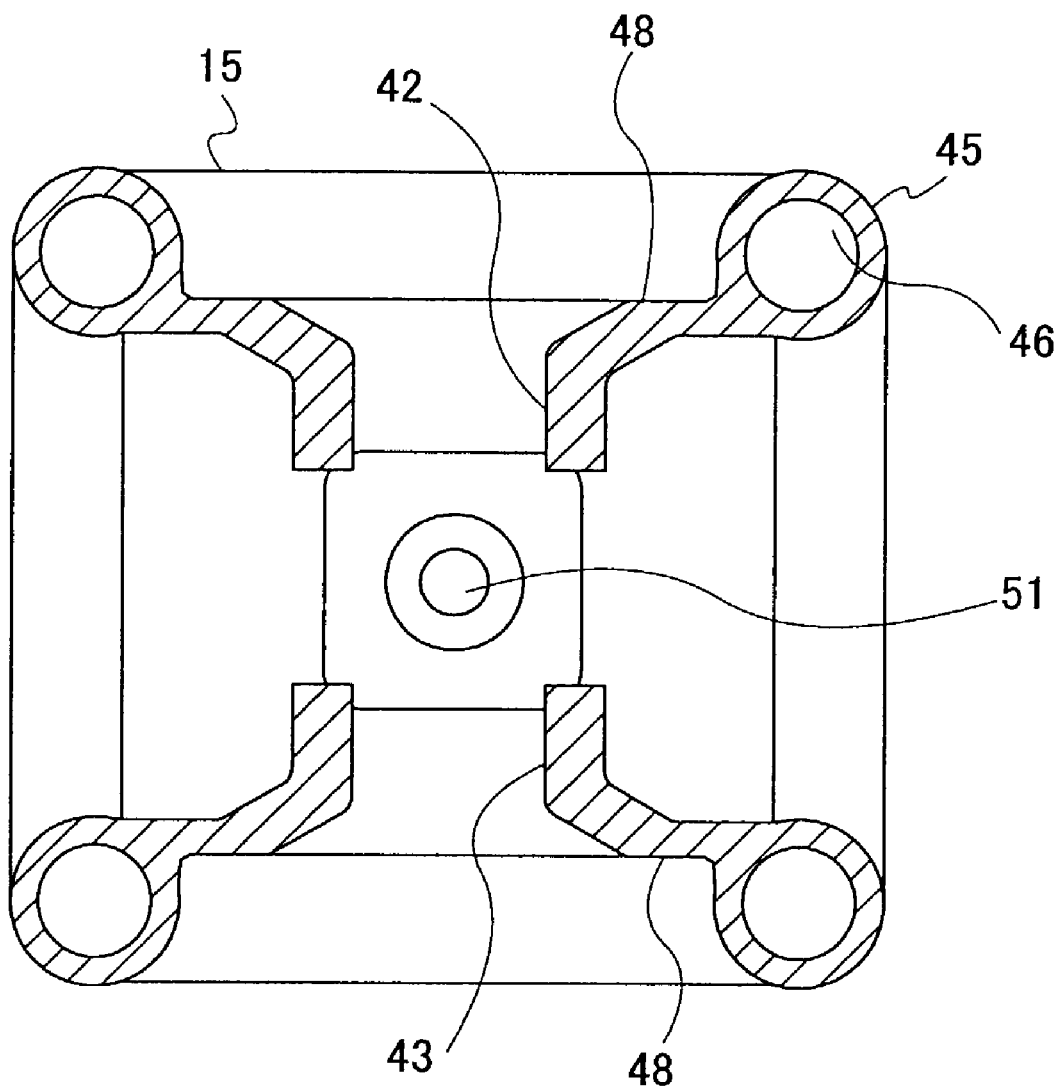
FIG. 11 is a cross section taken along the arrow B shown in FIG. 6 of the first embodiment of the present invention.
Figure 12:
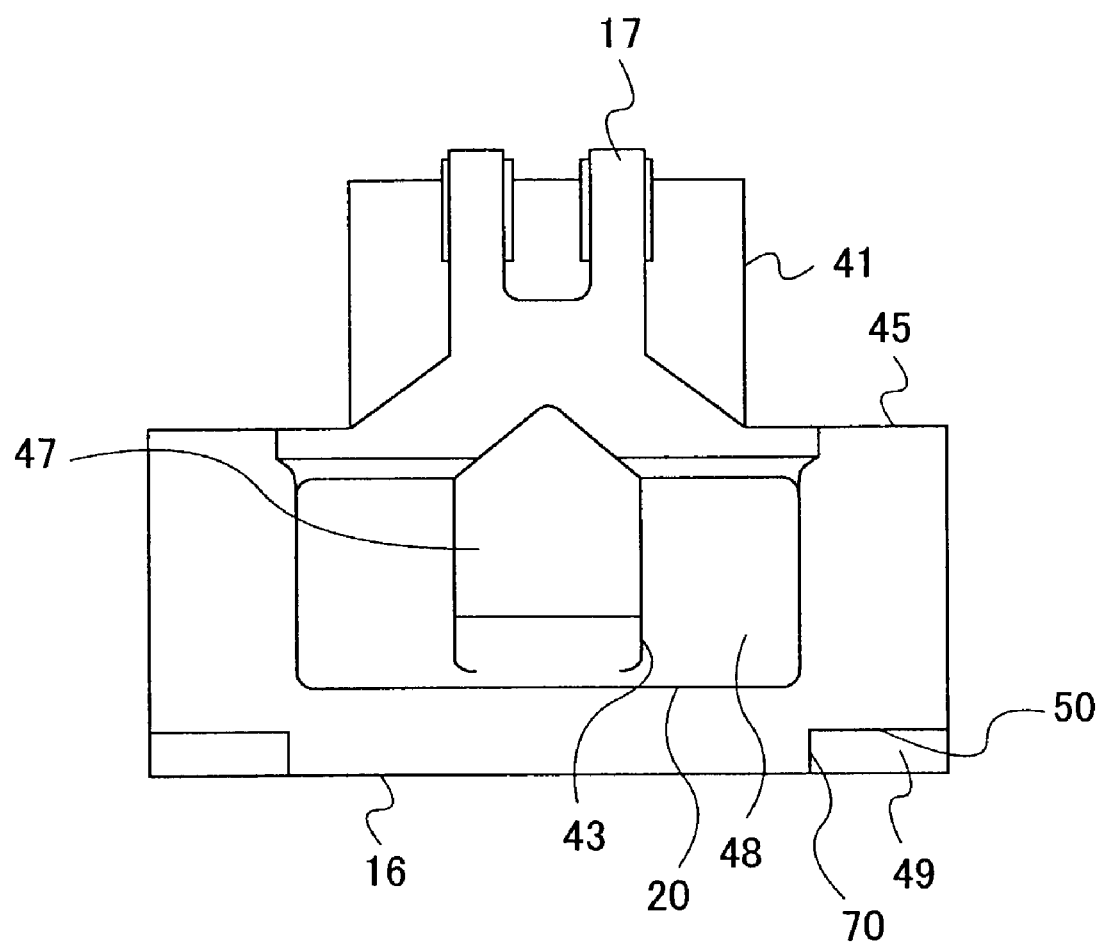
FIG. 12 is a view taken along the arrow C shown in FIG. 10 of the first embodiment of the present invention.
Figure 13:
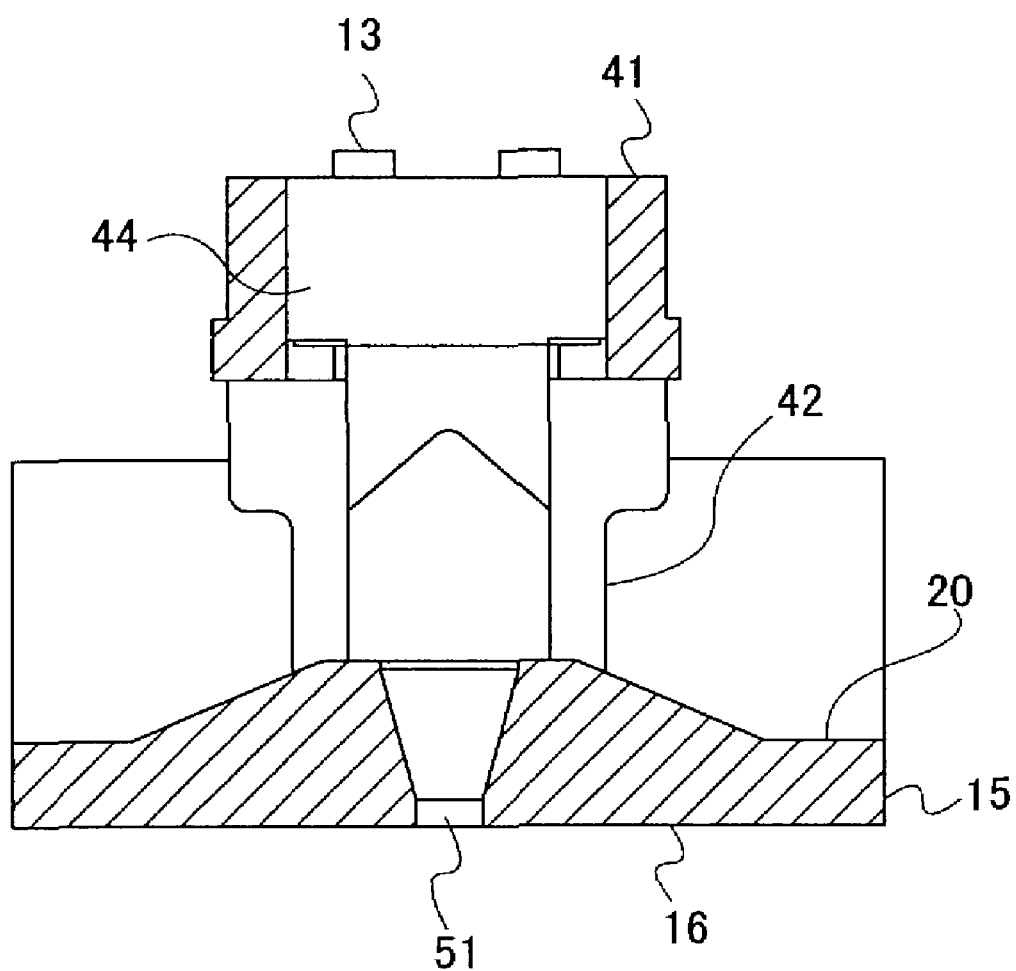
FIG. 13 is a cross section taken along the arrow D shown in FIG. 10 of the first embodiment of the present invention.
Figure 14:
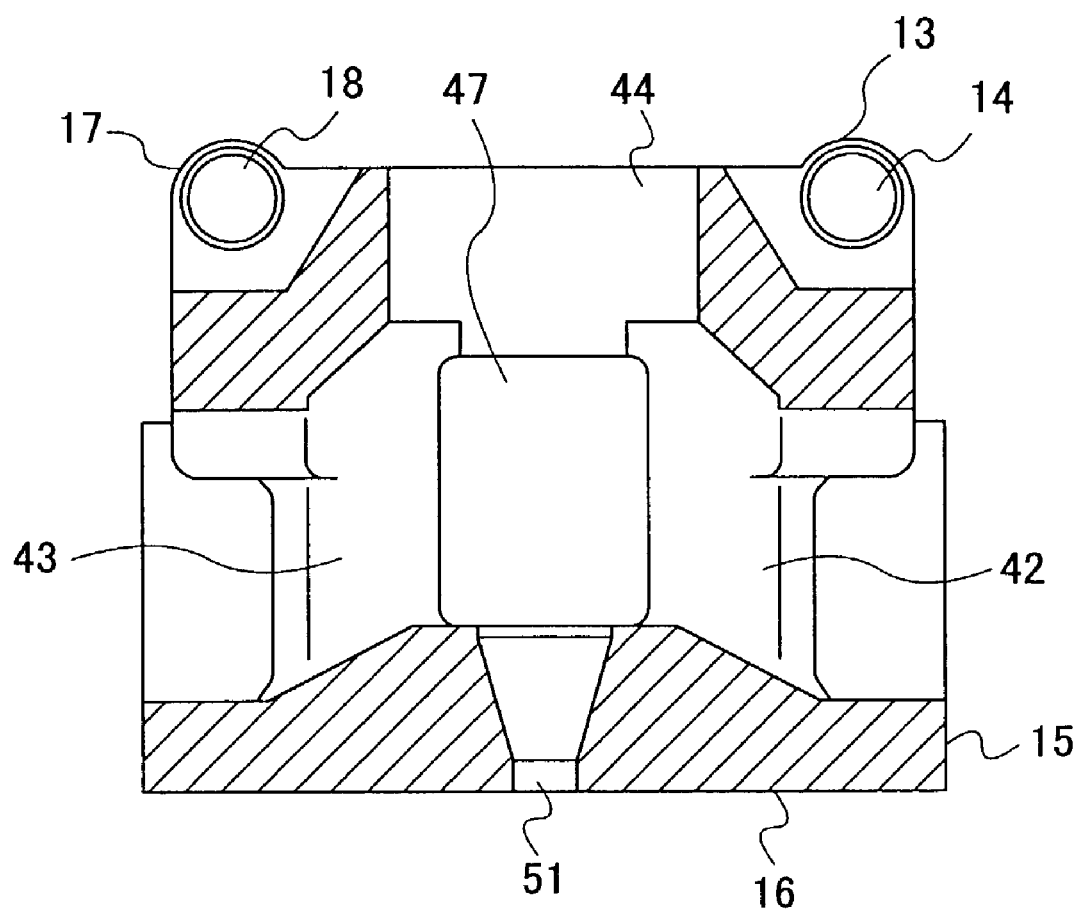
FIG. 14 is a cross section taken along the arrow E shown in FIG. 10 of the first embodiment of the present invention.

FIG. 4 is a perspective illustration of a movable mold support apparatus of the first embodiment of the present invention. FIG. 5 is a longitudinal section of the movable mold support apparatus shown in FIG. 4 of the first embodiment of the present invention. FIG. 6 is a side elevation of the movable mold support apparatus of the first embodiment of the present invention. FIG. 10 is a view taken along the arrow A shown in FIG. 6 of the first embodiment of the present invention. FIG. 11 is a cross section taken along the arrow B shown in FIG. 6 of the first embodiment of the present invention. FIG. 12 is a view taken along the arrow C shown in FIG. 10 of the first embodiment of the present invention. FIG. 13 is a cross section taken along the arrow D shown in FIG. 10 of the first embodiment of the present invention. FIG. 14 is a cross section taken along the arrow E shown in FIG. 10 of the first embodiment of the present invention.

Furthermore, a plurality of guide parts 45, for example four guide parts 45, slidably connecting to the tie bars 12, are provided at positions of the movable platen 11 corresponding to the respective tie bars 12. The guide part has a tie bar guide hole 46 as a guide hole. A bush not shown in FIGS. 4 through 14 which can slide against the tie bar 12, is inserted in each of the tie bar guide holes 46. The inner circumferential surface of the tie bar bush comes in contact with the outer circumferential surface of the tie bar 12 so that the movable platen 11 can slide. Grease as a lubricating material is received in a gap between the tie bar guide hole 46 and the tie bar 12. In a case where the tie bar bush is not used, the inner circumferential surface of the tie bar guide hole 46 comes in direct contact with the outer circumferential surface of the tie bar 12 so that the movable platen 11 can slide.

The guide part 45 has an end surface 50. The end surface 50 of the guide part 45 is remote from the position of the mold mounting surface 16 of the mold mounting plate 15 in the direction of the rear surface 20 of the mold mounting plate 15. The rear surface 20 is at an opposite side of the mold mounting surface 16 of the mold mounting plate 15. That is, as shown in FIGS. 6 and 12, the end surface 50 of the guide part 45 situated at the side of the mold mounting surface 16 is situated not at the same position of the mold mounting surface 16 but a position remote from the position of the mold mounting surface 16 in the direction of the rear surface 20.

Accordingly, a concave part 49 is formed around the tie bar guide hole 46 in the end surface 50 as becoming a hollow in an opposite direction of the movable mold 24. That is, the concave part 49 has a bottom surface forming a same surface as the end surface 50. The concave part 49 also has a side surface 70 situated in a direction perpendicular to a direction of the bottom surface.

The end surface 50 has a configuration similar to a rectangle, for example, having four sides longer than a diameter of the tie bar guide hole 46 and one corner having a curved configuration. The configuration of the end surface 50 of the concave part 49 is not limited to the above mentioned configuration, but may be a similar configuration with a circular configuration, for example. Because of the above mentioned structure, the grease leaking out from the gap between the inner circumferential surface of the tie bar bush and the outer circumferential surface of the tie bar 12 does not flow downward to the mold mounting surface 16 directly.

Figure 7:
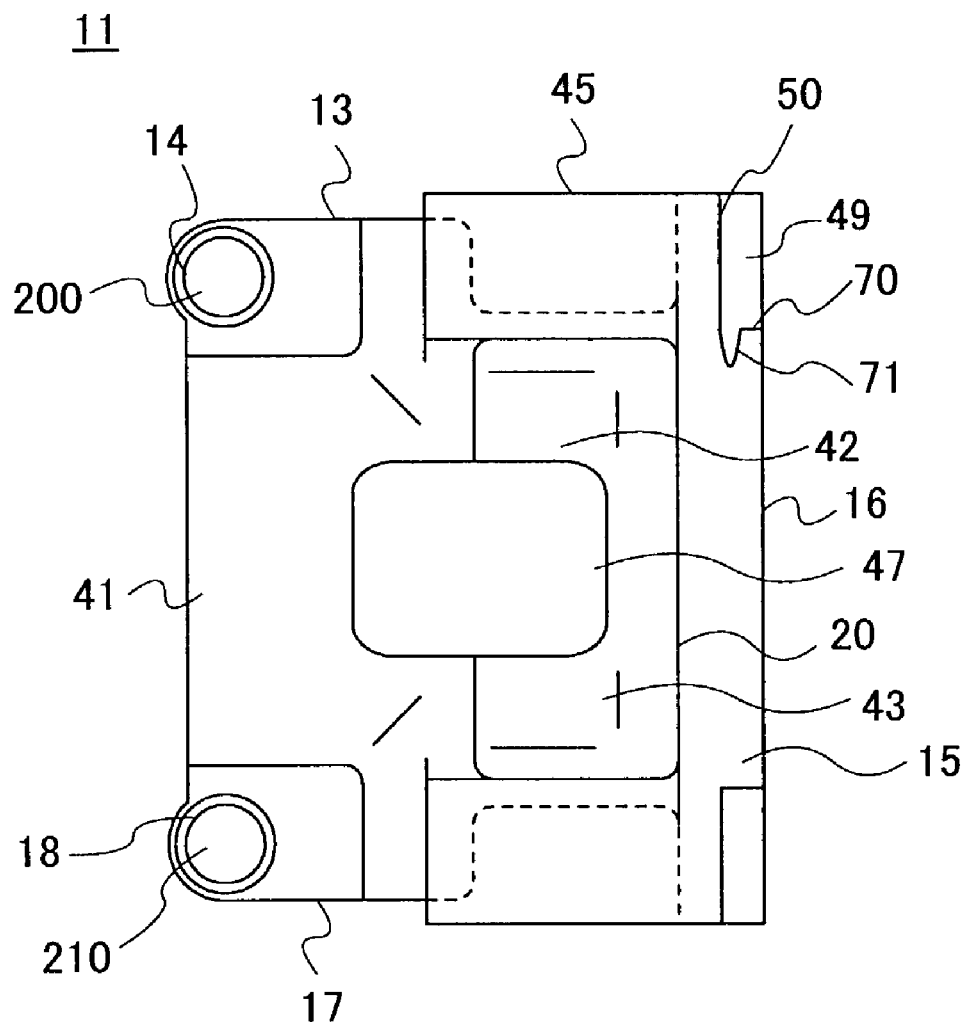
FIG. 7 is a side elevation of a movable mold support apparatus of the first modified example of the first embodiment of the present invention.
Figure 8:
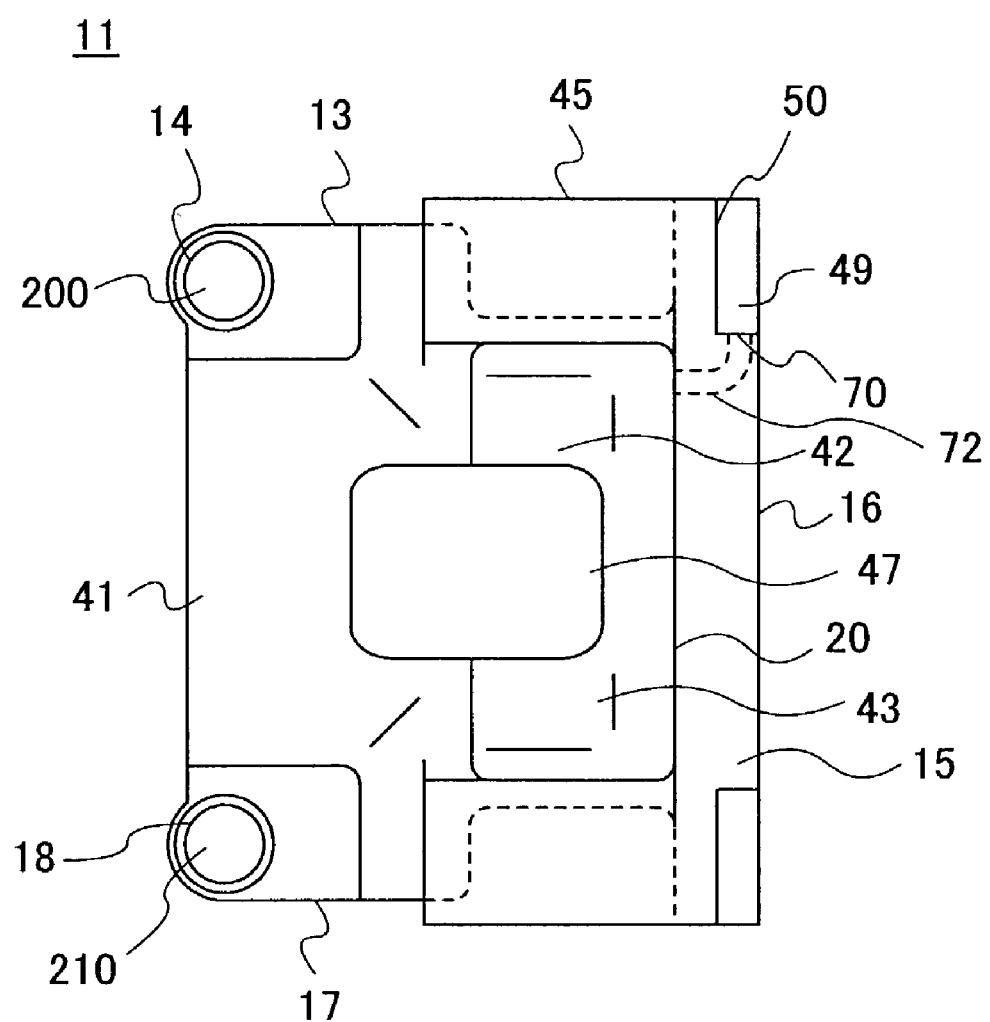
FIG. 8 is a side elevation of a movable mold support apparatus of the second modified example of the first embodiment of the present invention.
Figure 9:
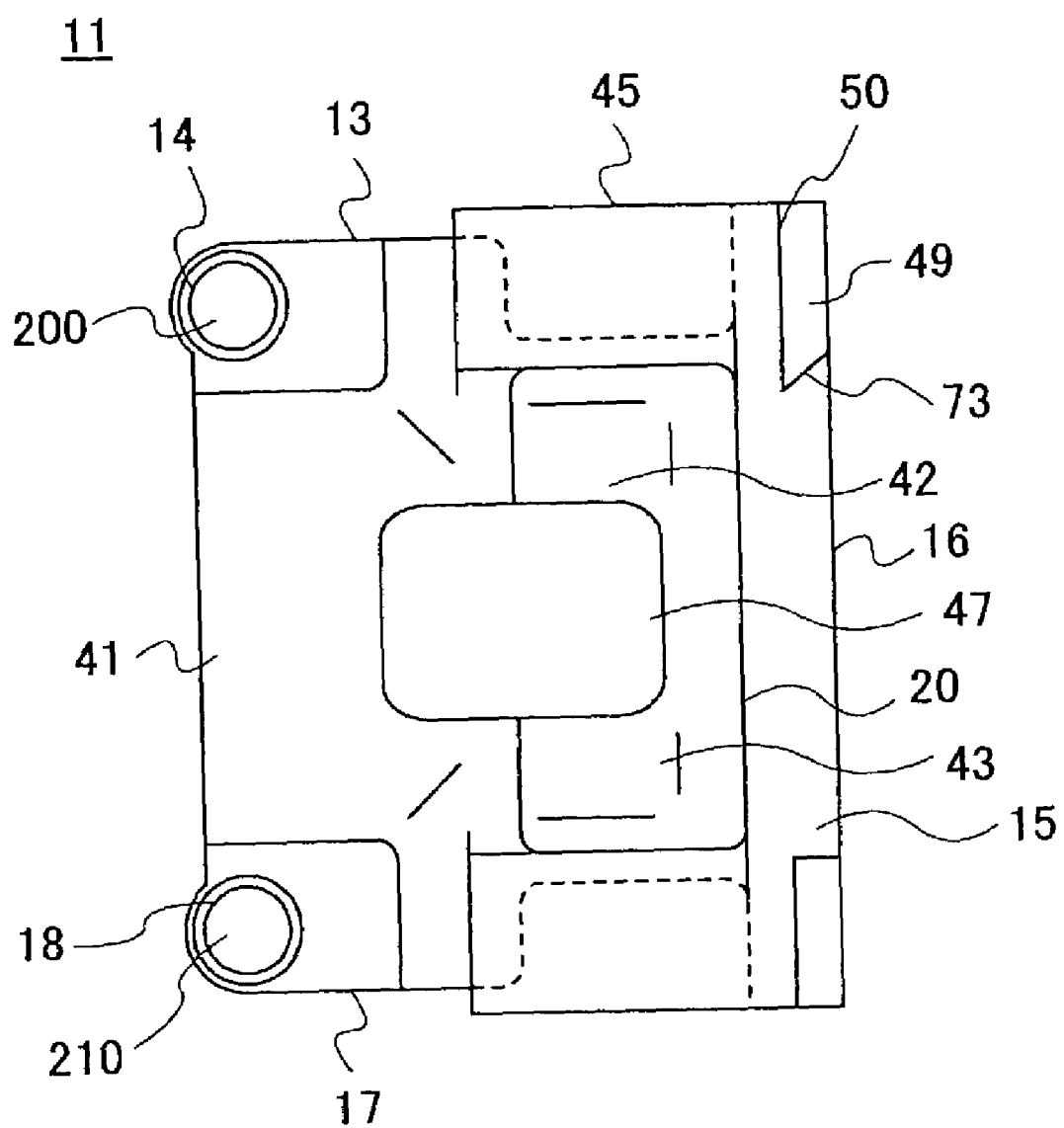
FIG. 9 is a side elevation of a movable mold support apparatus of the third modified example of the first embodiment of the present invention.

Meanwhile, FIG. 7 is a side elevation of a movable mold support apparatus of the first modified example of the first embodiment of the present invention. FIG. 8 is a side elevation of a movable mold support apparatus of the second modified example of the first embodiment of the present invention. FIG. 9 is a side elevation of a movable mold support apparatus of the third modified example of the first embodiment of the present invention.

As shown in FIG. 7, a groove part 71 leading to a side surface of the movable mold 24 may be formed at the side surface 70 of the concave part 49. Because of this structure, the grease leaking out from the gap between the inner circumferential surface of the tie bar bush and the outer circumferential surface of the tie bar 12 flows through the groove part 71. Hence, it is possible to prevent the grease from flowing downward to the mold mounting surface 16.

In addition, as shown in FIG. 8, a hole part 72 leading from the concave part 71 to the rear surface 20 of the mold mounting plate 15 may be formed at the side surface 70 of the concave part 49. Because of this structure, the grease leaking out from the gap between the inner circumferential surface of the tie bar bush and the outer circumferential surface of the tie bar 12 flows to the rear surface 20. Hence, it is possible to prevent the grease from flowing downward to the mold mounting surface 16.

Furthermore, as shown in FIG. 9, the concave part 49 may have a side surface 73 inclined to an opposite side to the side of the mold mounting surface 16, in stead of the side surface 70. Because of the above mentioned structure, the grease leaking out from the gap between the inner circumferential surface of the tie bar bush and the outer circumferential surface of the tie bar 12 does not flow downward to the mold mounting surface 16 directly.

The movable platen 11 has the mold mounting plate 15. The mold mounting surface 16 is formed on one side of the mold mounting plate 15.

The mold mounting plate 15 has a substantially rectangular configuration. A piercing hole 51 is disposed in the center of the mounting plate 15. The piercing hole 51 is necessary to accommodate an ejector rod for driving an ejector pin projecting into the cavity of the mold, for example. The piercing hole 51 may have any kind of configurations.

Furthermore, the mold mounting plate 15 may have a designated plate thickness between the mold mounting surface 16 and the rear surface 20. It is preferable, as shown in FIGS. 13 and 14, that the plate thickness in the vicinity of the center of the mold mounting plate 15 be greater than the plate thickness at any other position of the rear surface. This is because, as described later, the load from the first load receiving part 13 and the second load receiving part 17 can be transmitted to the vicinity of the center of the mold mounting plate 15 of the rear surface 20 by a first load transmit member 42 and a second load transmit member 43.

The first load receiving part 13 and the second load receiving part 17 are disposed at the rear surface 20, namely opposite the mold mounting surface 16 of the mold mounting plate 15. Although the first load receiving part 13 and the second load receiving part 17 are formed separately at a left side and a right side in this embodiment, the first load receiving part 13 and the second load receiving part 17 may be unified.

Referring to FIGS. 4, 6, 7, 8, and 9 the first load receiving part 13 has a first pin hole 14 where a first pin 200 of the toggle mechanism 22 can be inserted. The second load receiving part 17 has a second pin hole 18 where a second pin 210 of the toggle mechanism 22 can be inserted. As shown in FIG. 3, the toggle arm 33 of the toggle mechanism 22 is connected to the first pin 200 and the second pin 210. Hence, forces from the upper and lower toggle arms 33 of the toggle mechanism 22 act on the first load receiving part 13 and the second load receiving part 17 through the first pin 200 and the second pin 210. A bush for coming in contact with outer circumferential surfaces of the first pin and the second pin and rotating the first pin and the second pin may be inserted into the first pin hole 14 and the second pin hole 18.

The first load receiving part 13 and the second load receiving part 17 are connected to each other by a connecting member 41. The connecting member 41 has, for example, a pipe configuration 44 having a cross section perpendicular to the moving direction of the movable mold support apparatus having a substantially rectangular configuration. However, the configuration of the cross section is not limited to the above mentioned configuration and rather may be any kind of configuration. The connecting member 41 has an upper end connecting to the first load receiving part 13 and a lower end connecting to the second load receiving part 17.

For example, an apparatus equipped at the rear surface 20 of the mold mounting plate 15, such as an ejector rod unit or an ejector rod driving part, can be accommodated in the space of the pipe configuration 44.

Furthermore, the first load receiving part 13 is connected to the rear surface 20 of the mold mounting plate 15 by a first load transmit member 42 so that the load received by the first load receiving part 13 can be transmitted to the rear surface 20 of the mold mounting plate 15. The second load receiving part 17 is connected to the rear surface 20 of the mold mounting plate 15 by a second load transmit member 43 so that the load received by the second load receiving part 17 can be transmitted to the rear surface 20 of the mold mounting plate 15.

The end part at a side of the mold mounting plate 15 of the first load transmit member 42 is connected to a position in the rear surface 20 of the mold mounting plate 15 lower than the position of the first load receiving part 13. That is, the first load transmit member 42 has two ends. One end of the first load transmit member 42 connects to the first load receiving part 13. Another end connects to a position to the center of the mold mounting plate 15 in the rear surface 20 of the mold mounting plate 15 nearer than the position of the first load receiving part 13.

The end part at a side of the mold mounting plate 15 of the second load transmit member 43 is connected to a position in the rear surface 20 of the mold mounting plate 15 higher than the position of the second load receiving part 17. That is, the second load transmit member 43 has two ends. One end of the second load transmit member 43 connects to the second load receiving part 17. Another end connects to a position nearer to the center of the mold mounting plate 15 in the rear surface 20 of the mold mounting plate 15 than the position of the second load receiving part 17.

Although the first load transmit member 42 and the second load transmit member 43 are parted right and left in this embodiment, the first load transmit member 42 and the second load transmit member 43 may be unified. Furthermore, a single load transmit member formed by combing the first load transmit member 42 and the second load transmit member 43 and forming in a body may be used in the present invention.

The mold mounting plate 15 has a designated plate thickness between the mold mounting surface 16 and the rear surface 20. The plate thickness at a position where both the end at the side of the mold mounting plate 15 of the first load transmit member 42 and the end at the side of the mold mounting plate 15 of the second load transmit member 43 are connected with the rear surface 20, namely in the vicinity of the center of the rear surface 20, is greater than the plate thickness at any other position of the rear surface, as shown in FIGS. 13 and 14. Because of this, the part in the vicinity of the center of the mold mounting plate 15 is not deformed when the load from the first load receiving part 13 and the second load receiving part 17 is transmitted to the rear surface 20 of the mold mounting plate 15 by the first load transmit member 42 and the second load transmit member 43.

As shown in FIGS. 11 and 12, guide part connecting members 48 for connecting the guide parts 45 are connected to the first load transmit member 42 and the second load transmit member 43. The number of the guide part connecting members 48 corresponding to the number of the guide parts 45, for example four guide part connecting members 48, are disposed. One end of each of the guide part connecting members 48 is connected with the guide part 45 and another end of the guide part connecting members 48 is connected with the first load transmit member 42 or the second load transmit member 43.

The connecting member 41 has an end surface 90 facing the mold mounting plate 15. The end surface 90 of the connecting member 41 is remote from the rear surface 20 of the mold mounting plate 15. For example, an opening part 47 is formed so that it is possible to easily maintain and exchange the apparatus provided at the rear surface of the mold mounting plate and accommodated in the space in the connecting member having the pipe configuration, such as the ejector rod unit or the ejector rod driving part. The opening part 47 is opened in all directions. Therefore, it is possible for an operator of the injection molding machine to insert his/her hand in the opening part 47 and easily maintain and exchange the apparatus provided at the rear surface 20 of the mold mounting plate 15, such as the ejector rod unit or the ejector rod driving part. In addition, in a case where the ejector rod unit is connected to the ejector rod driving part, it is possible to omit to pulling up the movable mold 24 to exchange the ejector rod unit, the ejector rod driving part or the like.

The mold mounting plate 15, the first load receiving part 13, the second load receiving part 17, the first load transmit member 42, the second load transmit member 43, the connecting member 41, the guide part 45, and the guide part connecting member 48 are strong members receiving the forces for mold closing and mold clamping. Therefore, it is preferable that the above mentioned members are formed in a body by casting, for example, so as to form the movable platen 11.

Next, an operation of the movable mold support apparatus of the injection molding machine having the above mentioned structure will be described.

Figure 15:
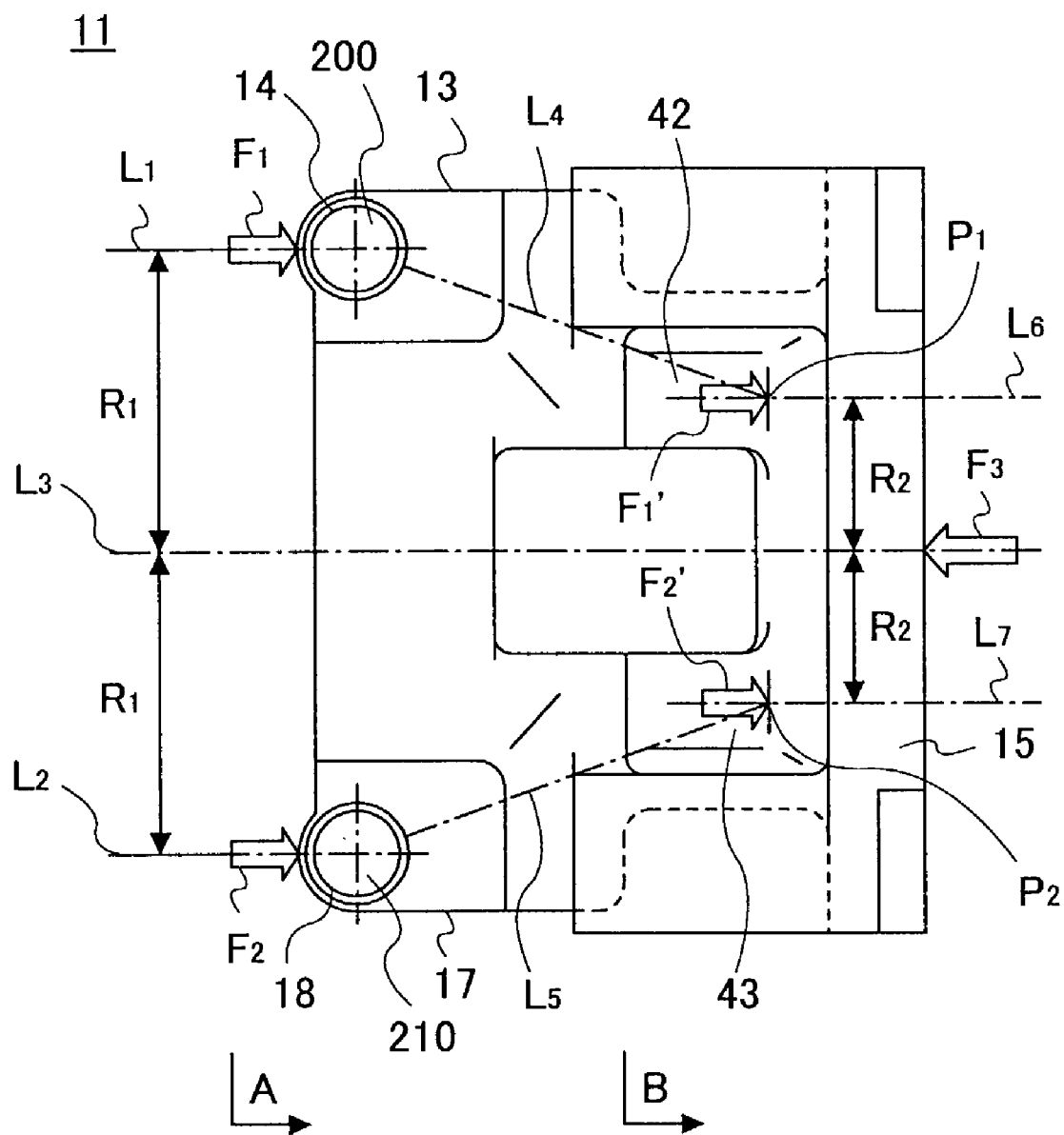
FIG. 15 is an illustration showing forces acting on the movable mold support apparatus of the injection molding machine of the first embodiment of the present invention.

FIG. 15 is an illustration showing forces acting on the movable mold support apparatus of the injection molding machine of the first embodiment of the present invention.

First of all, the driving part 31 of the driving apparatus 30 is operated to advance the cross head 35 so that the toggle mechanism 22 is operated and the movable platen 11 is advanced. As a result, the movable mold 24 comes in contact with the stationary mold 25 so as to perform mold closing and then mold clamping.

Next, a resin is injected from the injection machine not shown in FIG. 3 into the cavity of the movable mold 24 and the stationary mold 25 under high pressure so that the cavity is filled with the molten resin. The molten resin is then cooled and solidified so as to obtain a molded article.

Next, the driving part 31 is operated to retract the cross head 35 so that the movable platen 11 is retracted and the movable mold 24 is separated from the stationary mold 25 to perform mold opening. Next, after the ejector rod not shown in FIG. 3 is advanced, the ejector pin projects into the cavity of the inside of the movable mold 24 so as to eject the molded article. As a result of this, the molded article can be taken out. A large number of the molded articles can be produced by repeating the above mentioned operation.

The movable platen 11 repeatedly advances and retracts along the tie bars 12. Tie bar bushes not shown in FIG. 3 are inserted in the forward and the rearward tie bar guide holes 46 corresponding to the tie bar 12. Grease is received in a portion between the forward tie bar bush and the rearward tie bar bush. Therefore, the grease slightly enters in a gap between the inner circumferential surface of the tie bar bush and the outer circumferential surface of the tie bar 12. Accordingly, the inner circumferential surface of the tie bar bush and the outer circumferential surface of the tie bar 12 are well lubricated and slide smoothly against each other. Hence, the movable platen 11 can be advanced and retracted along the tie bar 12 smoothly.

When mold closing and mold clamping are performed, as shown in FIG. 15, pushing forces F1 and F2 from the upper and lower toggle arms 33 of the toggle mechanism 22 act on the first load receiving part 13 and the second load receiving part 17 of the movable platen 11 through the first pin 200 and the second pin 210. On the other hand, a react force from the stationary platen 23 as a pushing force F3 acts on the mold mounting surface 16 of the mold mounting plate 15 through the movable mold 24 and the stationary mold 25. In this case, the center of the force F3 is regarded as acting along a center axis line L3 of the mold mounting surface 16.

The end at the side of the mold mounting plate 15 of the first load transmit member 42 and the end at the side of the mold mounting plate 15 of the second load transmit member 43 are connected to positions nearer to the center of the mold mounting plate 15 in the rear surface 20 of the mold mounting plate 15 than the positions of the first load receiving part 13 and the second load receiving part 17.

Accordingly, when the force F1 and the force F2 from the upper and lower toggle arms are transmitted to the first load transmit member 42 and the second load transmit member 43 along the line L1 and the line L2, respectively, the force F1 and the force F2 act on a point P1 and a point P2 in the rear surface 20 of the mold mounting plate 15 along a line L6 and a line L7 as the force F1' and the force F2', respectively. Here, the center axis line L3 of the mold mounting plate 15 is a line having a same direction as a movable direction of the movable platen 11. The point P1 and the point P2 are points where a center line L4 of the first load transmit member 42 and a center line L5 of the second load transmit member 43 cross the rear surface 20 of the mold mounting plate 15. The line L1 and the line L2 are lines parallel to the center axis line L3 of the mold mounting plate 15 and pass through the first load receiving part 13 and the second load receiving part 17, respectively. The line L6 and the line L7 are lines parallel to the center axis line L3 of the mold mounting plate 15 and pass through the point P1 and the point P2, respectively, of the rear surface 20 of the mold mounting plate 15. The force F1' and the force F2' are equal in size to the force F1 and the force F2, respectively.

In this case, the distance R2 having direction perpendicular to the direction of the center axis line L3 of the mold mounting plate 15 between the line L6 or the line L7 and the center axis line L3, is shorter than the distance R1 having direction perpendicular to the direction of the center axis line L3 of the mold mounting plate 15 between the line L1 or the line L2 and the center axis line L3. That is, the end at the side of the mold mounting plate 15 of the first load transmit member 42 and the end at the side of the mold mounting plate 15 of the second load transmit member 43 are connected to positions nearer to the center of the mold mounting plate 15 in the rear surface 20 of the mold mounting plate 15 than the position of the first load receiving part 13 and the second load receiving part 17. Accordingly, bending moments acting on the mold mounting plate 15 due to the force F1' and the force F2' are small.

Figure 1:
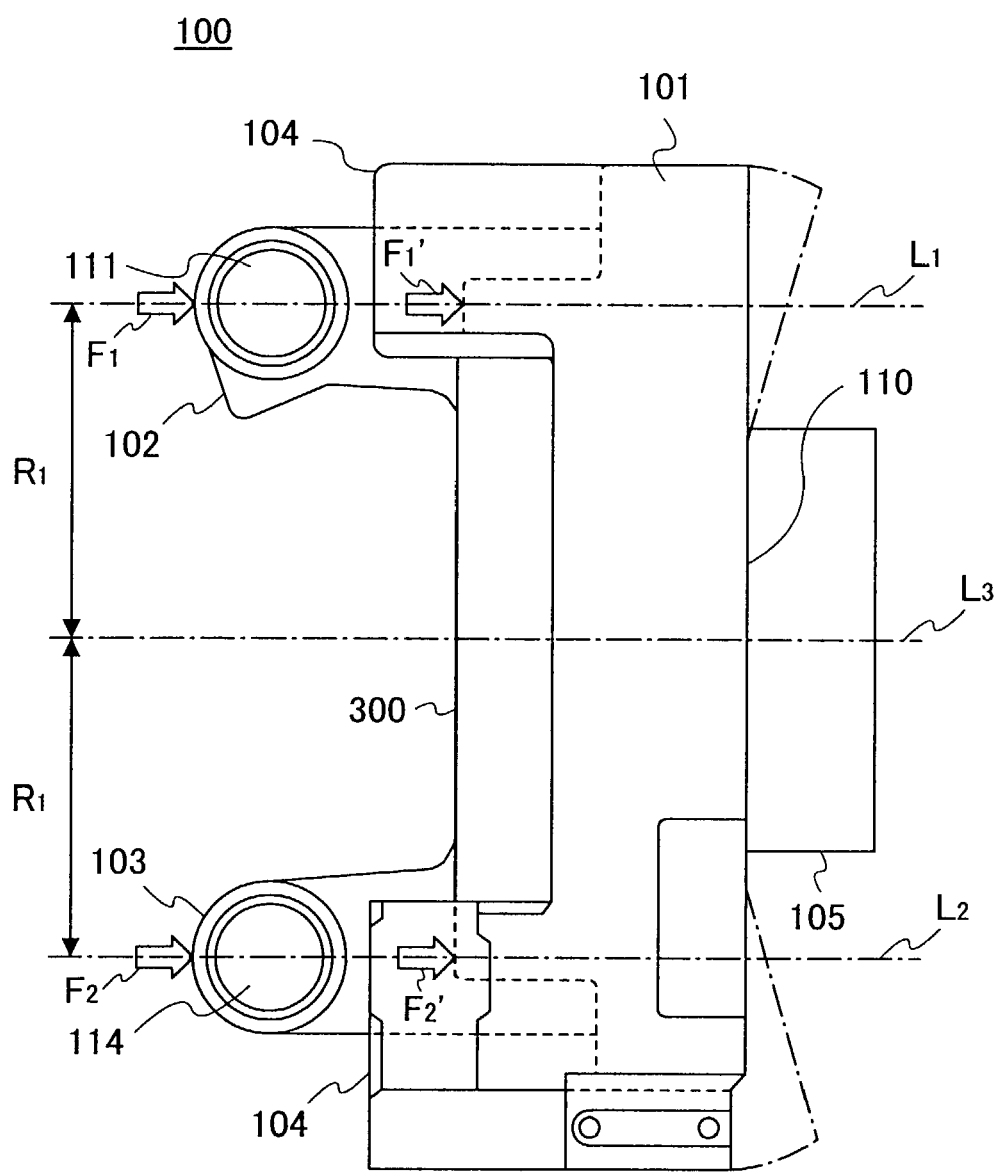
FIG. 1 is a first sectional view of a movable platen of a related art injection molding machine.
Figure 2:
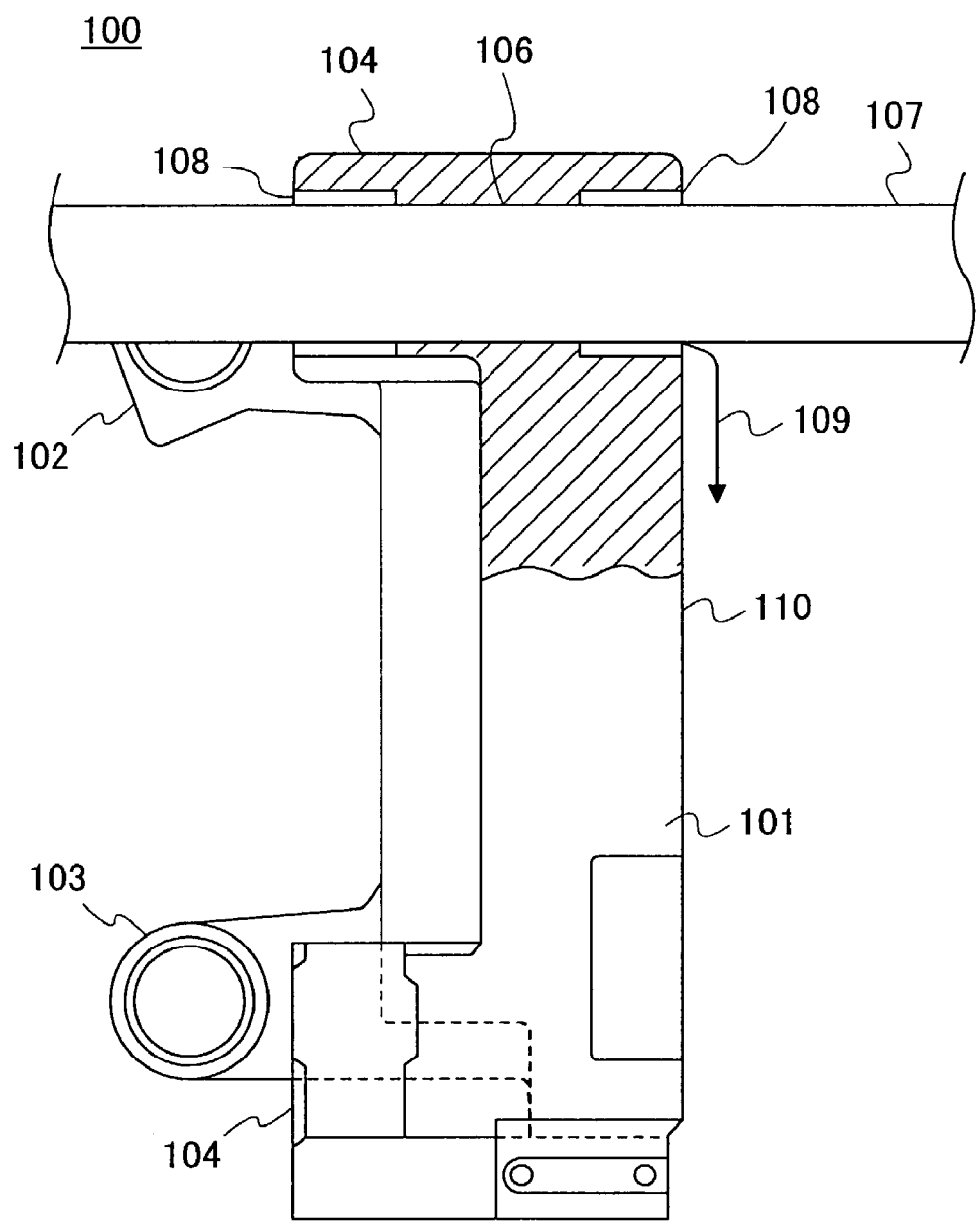
FIG. 2 is a second sectional view of the movable platen of the related art injection molding machine.

In a case where the movable platen 11 has a structure of the movable platen 100 of the related art injection molding machine as shown in FIG. 1, the force F1' and the force F2' are acting on the points where the line L1 and the line L2 cross the rear surface 300 of the mold mounting plate 101. Accordingly, in this related art case, the distance R1 between the line L1 or the line L2 and the center axis line L3 is much longer than the above mentioned distance R2 of the present invention so that the bending moment acting on the mold mounting plate 101 in the related art case is large.

However, in this embodiment, a distance between an acting point of the pushing force F1' from the upper toggle arm 33 acting on the mould mounting plate 15 and an acting point of the react pushing force F3, or a distance between an acting point of the pushing force F2' from the lower toggle arm 33 acting on the mould mounting plate 15 and an acting point of the react pushing force F3 is short. Hence, the bending moment acting on the mold mounting plate 15 is small. Therefore, the mold mounting plate 15 is not bent by the bending moment. In addition, in a case where the area in the vicinity of the center of the mold mounting plate 15 has an increased plate thickness as shown in FIGS. 13 and 14, the mold mounting plate 15 is not deformed by the force F1' and the force F2'.

The first load receiving part 13 and the second load receiving part 17 are connected to the point P1 and the point P2 in the rear surface 20 of the mold mounting plate 15 through the first load transmit member 42 and the second load transmit member 43. Hence, the forces pushing up and down on the first load receiving part 13 and the second load receiving part 17 from the point P1 and the point P2 as a center are transmitted to the first load receiving part 13 and the second load receiving part 17 by the forces F1 and F2. That is, a force separating the first load receiving part 13 from the second load receiving part 17 is transmitted.

However, in this embodiment, since the first load receiving part 13 and the second load receiving part 17 are connected by the connecting member 41, the first load receiving part 13 and the second load receiving part 17 are not separated.

Thus, in this embodiment, the forces from the upper and lower toggle arms 33 are transmitted to the first load transmit member 42 and the second load transmit member 43 and act on the points P1 and P2 which are close to the center of the rear surface 20 of the mold mounting plate 15.

Accordingly, the bending moment acting on the mold mounting plate 15 is small. Therefore, even if the plate thickness of the mold mounting plate 15 is not increased, the mold mounting plate 15 is not bent. Hence, it is possible to prevent the mold mounting surface 16 and the movable mold 24 from being deformed so that the quality of the molded article is prevented from being reduced.

As described above, the end surface 50 at the side of the mold mounting surface 16 of the guide part 45 is remote from a position of the mold mounting surface 16 of the mold mounting plate 15 in a direction of the rear surface 20 of the mold mounting plate 15. Therefore, the grease leaking out from the gap between the inner circumferential surface of the tie bar guide hole 46 and the outer circumferential surface of the tie bar 12 does not flow directly downward to the mold mounting surface 16.

Next, a description of the second embodiment of the present invention will now be given. In the second embodiment, parts that are the same as the parts shown in the first embodiment are given the same reference numerals, and explanation thereof will be omitted.

Figure 16:
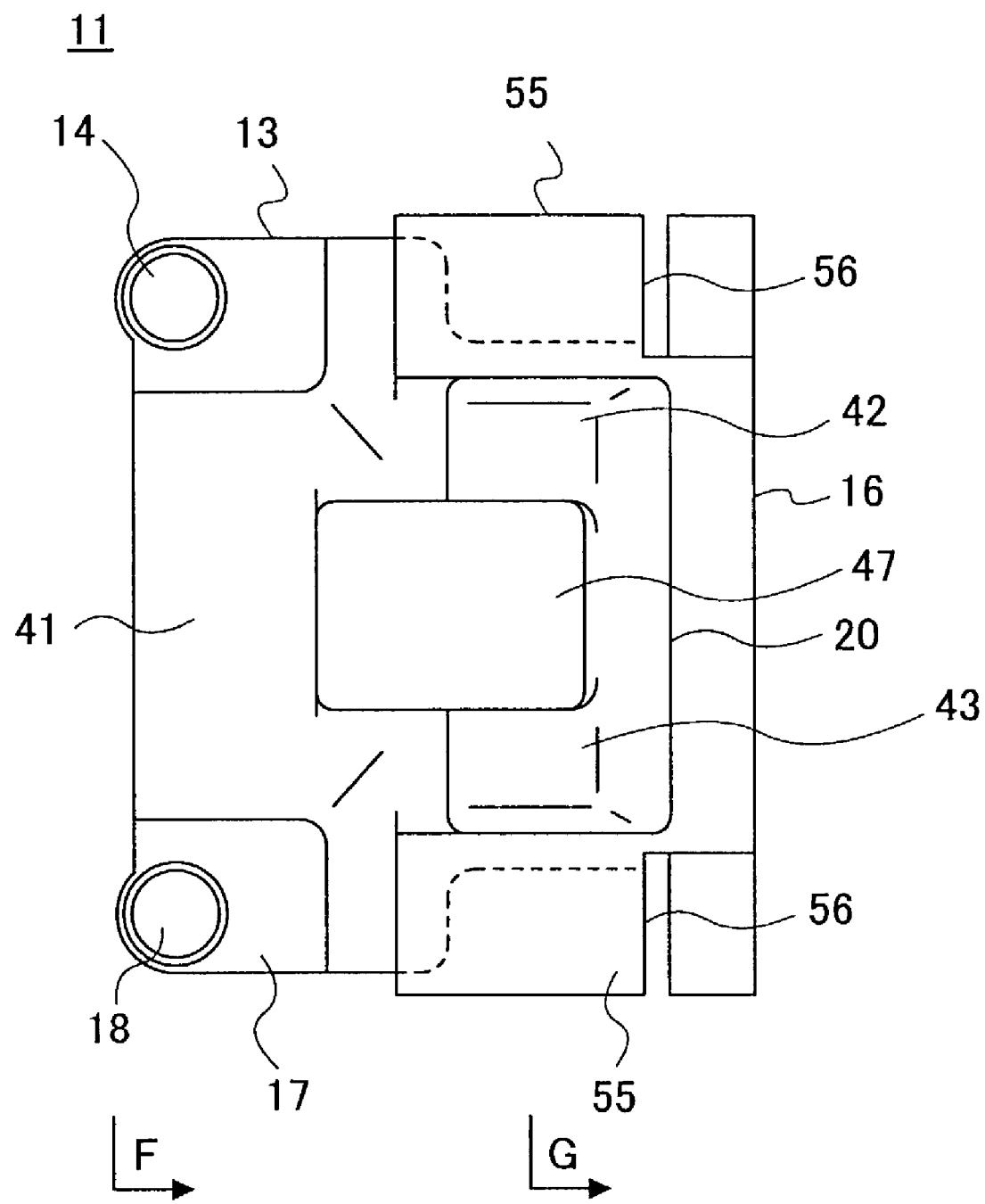
FIG. 16 is a side elevation of a movable mold support apparatus of an injection molding machine of the second embodiment of the present invention.
Figure 17:
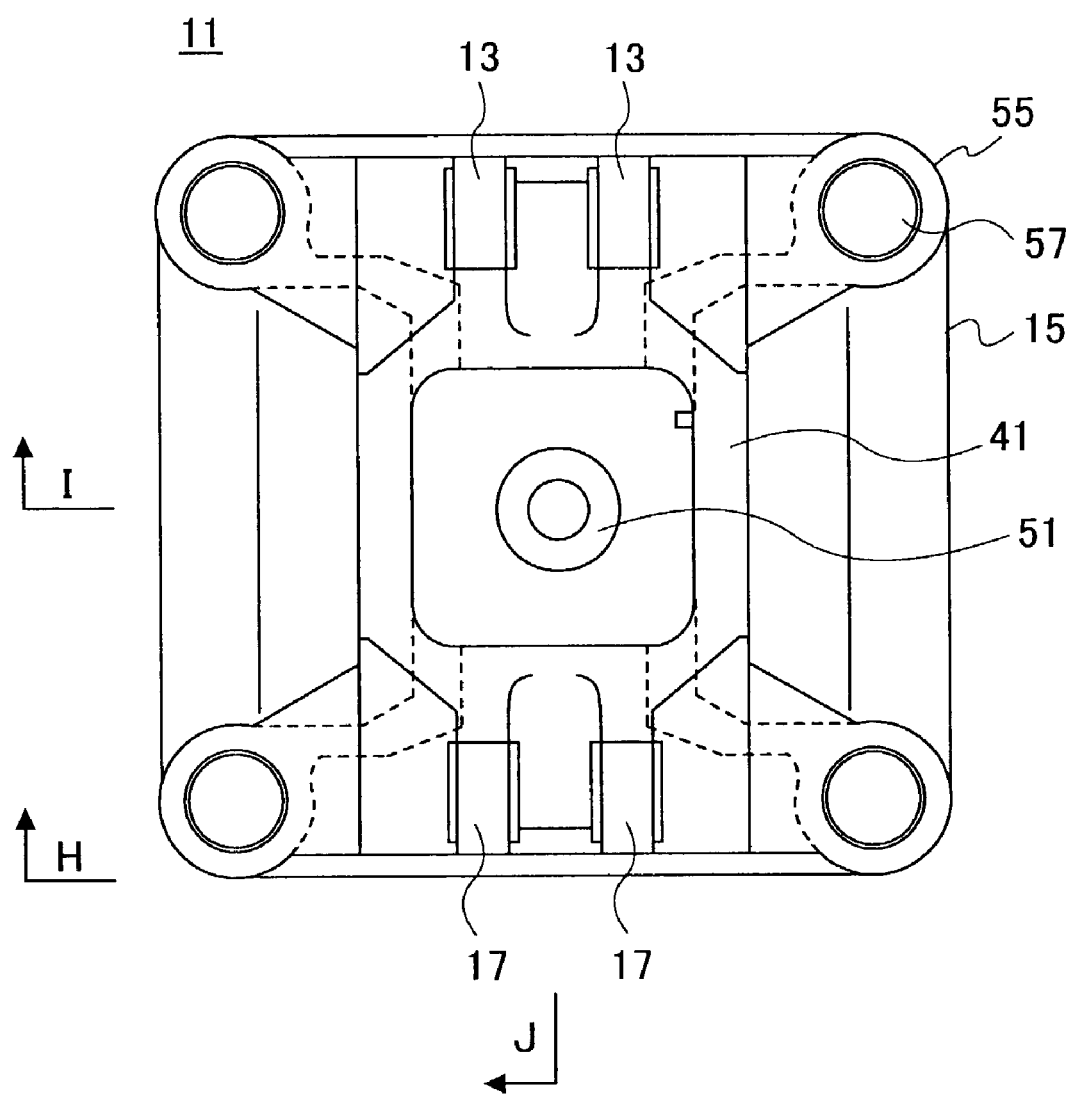
FIG. 17 is a view taken along an arrow F shown in FIG. 16 of the second embodiment of the present invention.
Figure 18:
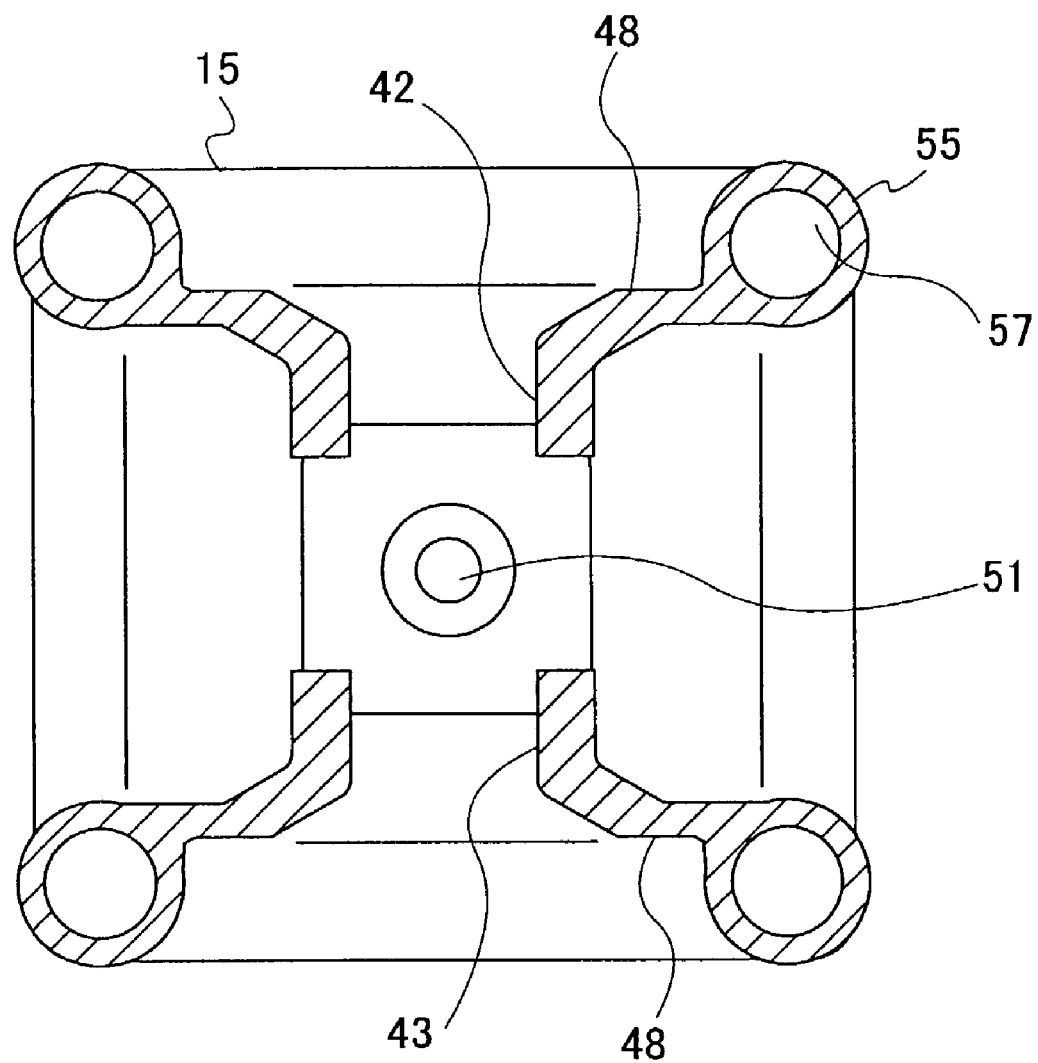
FIG. 18 is a cross section taken along an arrow G shown in FIG. 16 of the second embodiment of the present invention.
Figure 19:
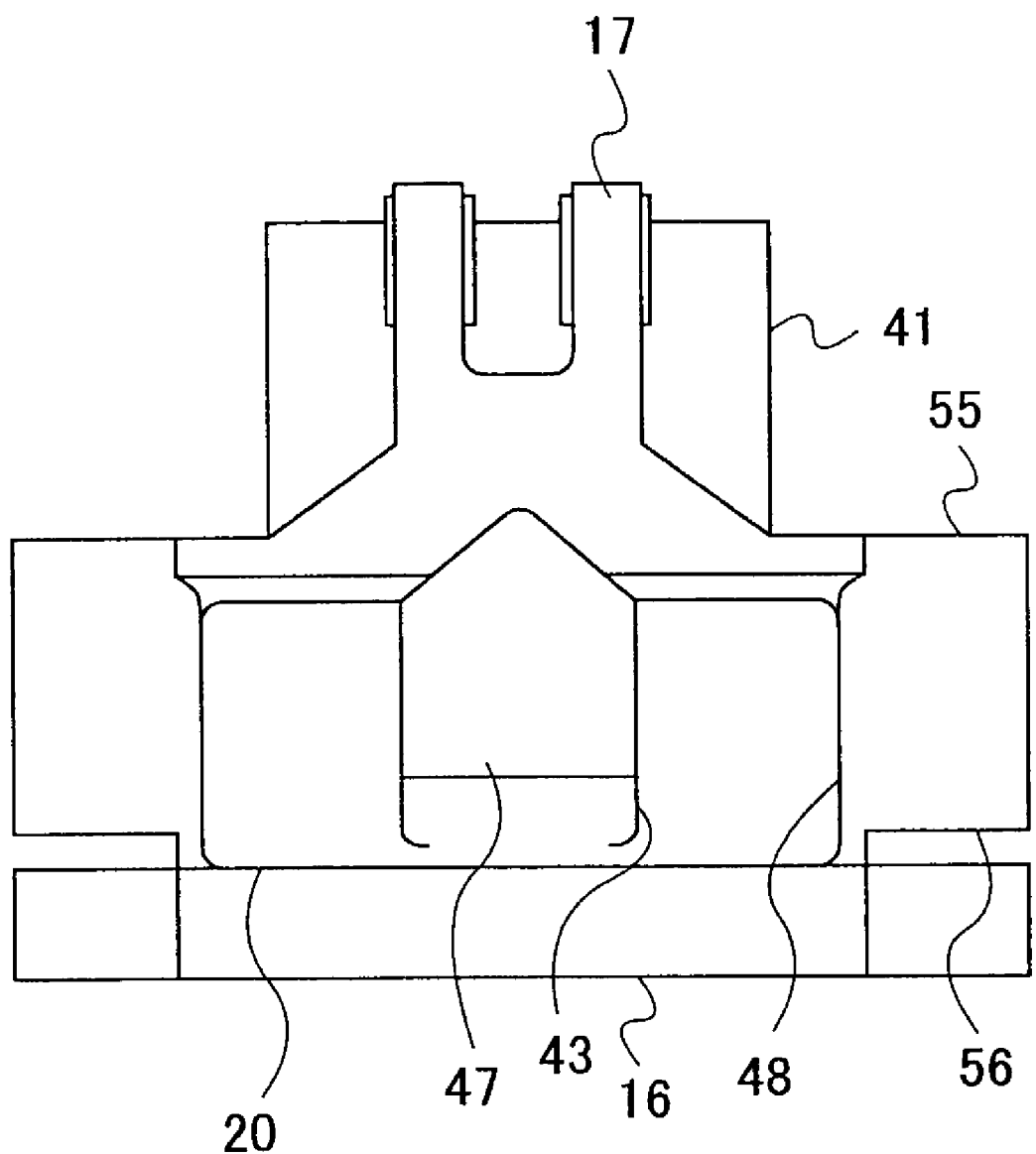
FIG. 19 is a view taken along an arrow H shown in FIG. 17 of the second embodiment of the present invention.
Figure 20:
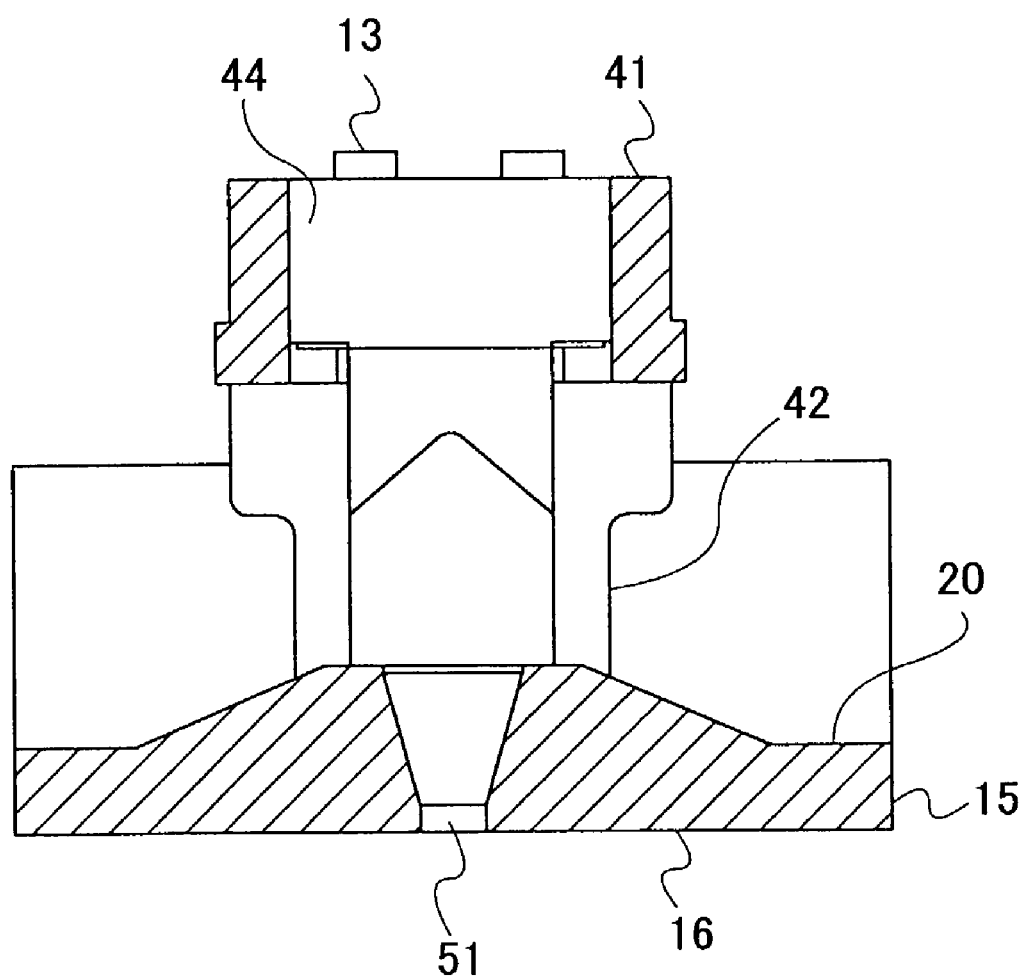
FIG. 20 is a cross section taken along an arrow I shown in FIG. 17 of the second embodiment of the present invention.
Figure 21:
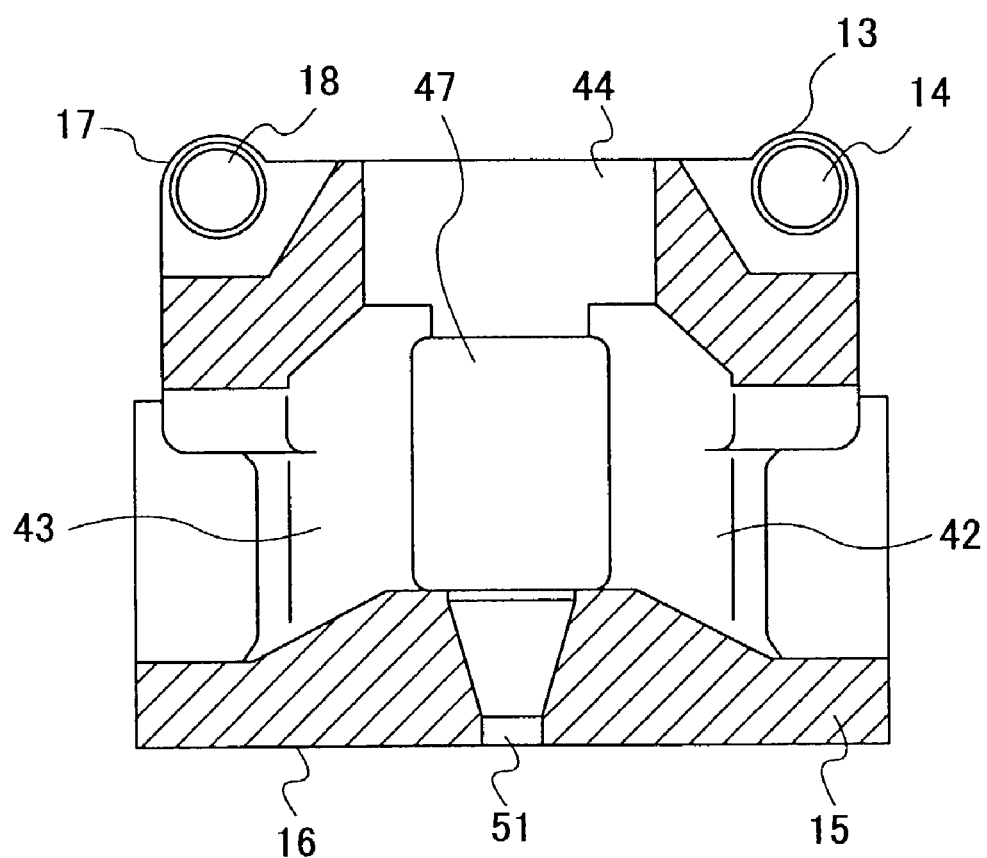
FIG. 21 is a cross section taken along an arrow J shown in FIG. 17 of the second embodiment of the present invention.

FIG. 16 is a side elevation of a movable mold support apparatus of an injection molding machine of the second embodiment of the present invention. FIG. 17 is a view taken along an arrow F shown in FIG. 16 of the second embodiment of the present invention. FIG. 18 is a cross section taken along an arrow G shown in FIG. 16 of the second embodiment of the present invention. FIG. 19 is a view taken along an arrow H shown in FIG. 17 of the second embodiment of the present invention. FIG. 20 is a cross section taken along an arrow I shown in FIG. 17 of the second embodiment of the present invention. FIG. 21 is a cross section taken along an arrow J shown in FIG. 17 of the second embodiment of the present invention.

Referring to FIGS. 16 through 21, in the second embodiment of the present invention, in the movable platen 11 as a movable mold support apparatus, a plurality of guide parts, for example four guide parts 55, connecting to the tie bars 12, are provided at positions of the movable platen 11 corresponding to the respective tie bars 12. The guide part 55 has a tie bar guide hole 57 as a guide hole connecting the tie bar 12 as a guide member.

A structure of the guide part 55 is substantially same as the structure of the guide part 45 of the first embodiment of the present invention.

A bush not shown in FIGS. 16 through 21, which can slide against the outer circumferential surface of the tie bar 12 is inserted in each of the tie bar guide holes 46. An inner circumferential surface of the tie bar bush comes in contact with the outer circumferential surface of the tie bar 12 so that the movable platen 11 can slide. Grease as a lubricant material is received in a gap between the tie bar guide hole 57 and the tie bar 12. In a case where the tie bar bush is not used, the inner circumferential surface of the tie bar guide hole 57 comes directly in contact with the outer circumferential surface of the tie bar 12 so that the movable platen 11 can slide.

However, the guide part 55 in the second embodiment is shorter than the guide part 45 in the first embodiment. An end surface 56 of the guide part 55 situated at the side of the mold mounting surface 16 is situated not at the same position of the rear surface 20 but a position remote from the rear surface 20 in the direction of the first load receiving part 13 and the second load receiving part 17. That is, as shown in FIGS. 16 and 19, a gap is formed between the end surface 56 of the guide part 55 situated at the side of the mold mounting surface 16 and the rear surface 20 of the mold mounting plate 15.

Because of the above mentioned structure, the grease leaking out from the gap between the inner circumferential surface of the tie bar bush and the outer circumferential surface of the tie bar 12 flows downward but not down to the mold mounting surface 16.

Next, an operation of the movable mold support apparatus of the injection molding machine having the above mentioned structure will be described, according to the second embodiment.

First of all, the driving part 31 of the driving apparatus 30 is operated to advance the cross head 35 so that the toggle mechanism 22 is operated and the movable platen 11 is advanced. As a result, the movable mold 24 comes in contact with the stationary mold 25 so as to perform mold closing and then mold clamping.

Next, a resin is injected from the injection machine into the cavity of the movable mold 24 and the stationary mold 25 under high pressure so that the cavity is filled with the molten resin. The molten resin is then cooled and solidified so as to obtain a molded article.

Next, the driving part 31 is operated to retract the cross head 35 so that the movable platen 11 is retracted and the movable mold 24 is separated from the stationary mold 25 to perform mold opening. Next, after the ejector rod not shown in FIG. 3 is advanced, the ejector pin projects into the cavity of the inside of the movable mold 24 so as to eject the molded article. As a result of this, the molded article can be taken out. A large number of the molded articles can be produced by repeating the above mentioned operation.

The movable platen 11 repeatedly advances and retracts along the tie bar 12. Tie bar bushes are inserted in forward and rearward tie bar guide holes 57 corresponding to the tie bar 12. Grease is received in a portion between the forward tie bar bush and the rear ward tie bar bush. Therefore, the grease slightly enters in a gap between the inner circumferential surface of the tie bar bush and the outer circumferential surface of the tie bar 12. Accordingly, the inner circumferential surface of the tie bar bush and the outer circumferential surface of the tie bar 12 are well lubricated well and slide smoothly. Hence, the movable platen 11 can be smoothly advanced and retracted along the tie bar 12 smoothly.

When the mold clamping apparatus repeats the above mentioned action for a long time, the grease leaks out from the tie bar guide hole 57 or the gap between the inner circumferential surface of the tie bar bush and the outer circumferential surface of the tie bar 12 little by little. In this embodiment, the end surface 56 of the guide part 55 situated at the side of the mold mounting surface 16 is situated not at the same position at the rear surface 20 but at a position remote from the position of the rear surface 20 in a direction of the first load receiving part 13 and the second load receiving part 17. Therefore, a gap is formed between the mold mounting surface 56 of the guide part 55 and the rear surface 20. Because of this structure, the grease leaking out from the gap between the inner circumferential surface of the tie bar bush and the outer circumferential surface of the tie bar 12 flows downward but not down to the mold mounting surface 16. Therefore, the grease leaking out does not adhere to the mold mounting surface 16. Hence, neither the mold mounting surface 16 nor the movable mold 24 mounted on the mold mounting surface 16 is contaminated with the grease.

The grease leaking out flows downward and adheres to a surface of the frame 21 or a floor surface where the mold clamping apparatus is situated. However, these surfaces are remote from the movable mold 24 or the stationary mold 25. Therefore, there is no likelihood that the grease adhering on these surfaces adheres to the molded article. In addition, since the amount of the grease leaking out is small, there is no problem in terms of the contamination of the mold clamping apparatus or other peripheral apparatuses.

Furthermore, grease leaking out from the gap between the inner circumferential surface of the tie bar guide hole 57 and the outer circumferential surface of the tie bar 12 with respect to a surface at an opposite side to the surface 56 at the mold mounting surface 16, also flows downward. However, the surface at the side opposite to the surface 56 at the mold mounting surface 16 is remote from the movable mold 24 or the stationary mold 25. Therefore, there is no likelihood that the grease adhering on the surface at the opposite side to the surface 56 at the mold mounting surface 16 adheres to the molded article. Since the amount of the grease leaking out is small, there is no problem in terms of the contamination of the mold clamping apparatus or other peripheral apparatuses.

In this embodiment, a force acting on the movable platen 11 at the time of mold closing and mold clamping is the same as the force in the first embodiment and explanation thereof will be omitted.

Thus, in this embodiment, the end surface 56 of the guide part 55 situated at the side of the mold mounting surface 16 is situated not at the same position of the rear surface 20 but at a position remote from the position of the rear surface 20 in a direction of the first load receiving part 13 and the second load receiving part 17. Therefore, a gap is formed between the mold mounting surface 56 of the guide part 55 and the rear surface 20.

Therefore, the grease leaking out from the gap between the inner circumferential surface of the tie bar guide hole 57 and the outer circumferential surface of the tie bar 12 with respect to the surface 56 at the side of the mold mounting surface 16 flows downward but not down to the mold mounting surface 16. Therefore, the grease leaking out does not adhere to the mold mounting surface 16. Hence, the mold mounting surface 16 and the movable mold 24 mounted on the mold mounting surface 16 are not contaminated by the grease.

Next, a description of the third embodiment of the present invention will now be given. In the third embodiment, parts that are the same as the parts shown in the first and second embodiments are given the same reference numerals, and explanation thereof will be omitted.

Figure 22:
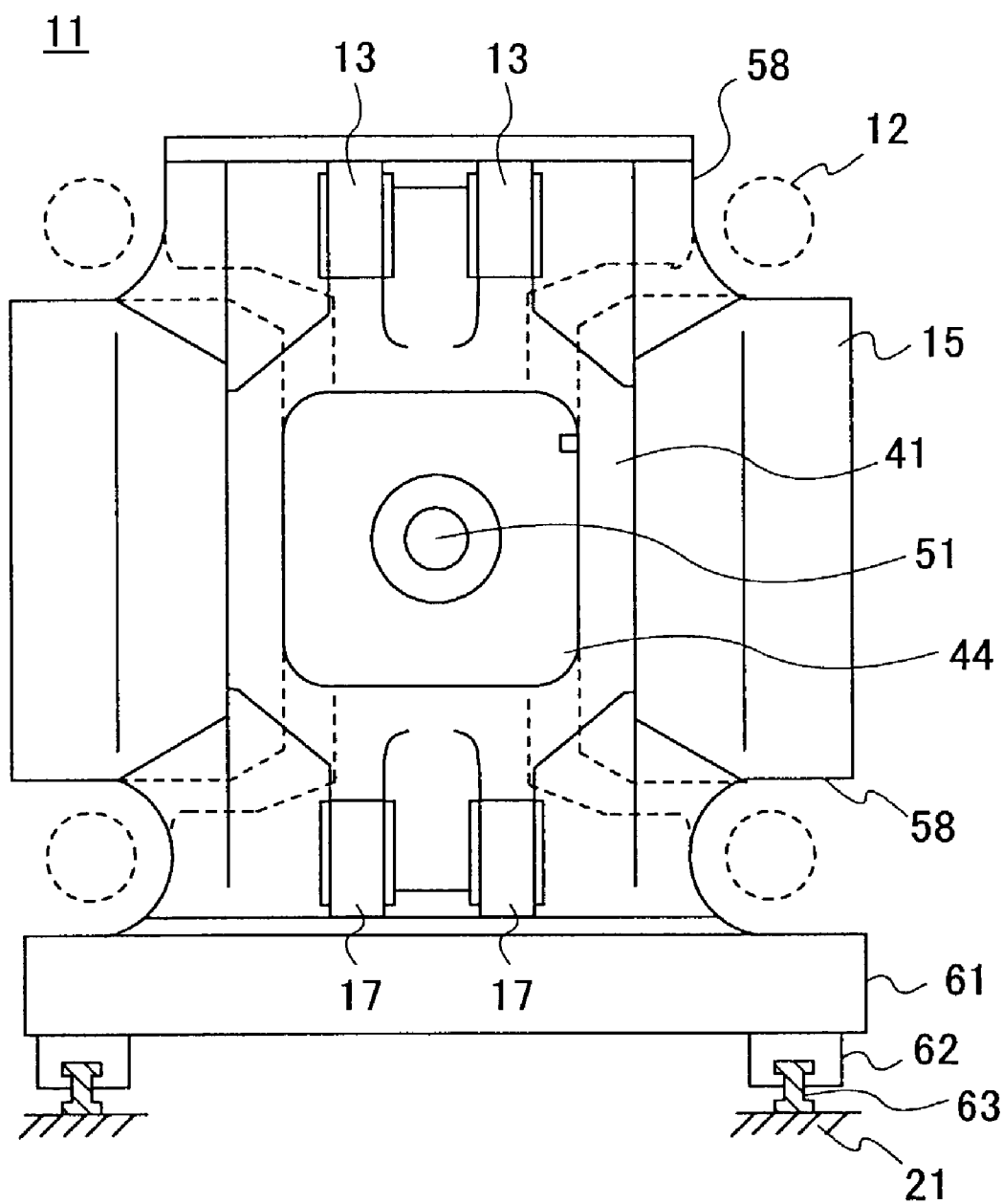
FIG. 22 is a rear elevation of a movable mold support apparatus of an injection molding machine of the third embodiment of the present invention.

FIG. 22 is a rear elevation of a movable mold support apparatus of an injection molding machine of the third embodiment of the present invention. Referring to FIG. 22, in this embodiment, a guide rail 63 as a guide member is disposed on an upper surface of the frame 21. A receiving guide 62 as a guide part is disposed on the lower surface of a base member 61 provided at the lower end of the movable platen 11. The receiving guide 62 may be may be directly disposed on the lower end surface of the movable platen 11 without using the base member 61. In addition, the guide rail 63 may be disposed on members other than the frame 21.

It is preferable that the guide rail 63 be a rail of a linear guide way and the receiving guide 62 be a carriage of the linear guide way. The linear guide way is called "linear system", "linear guide", or "LM (Linear Motion) guide". The linear guide way is a system in which the rail is received by the carriage and the carriage can be moved along the rail. In this case, a large number of rolling members such as rollers or balls are disposed between the carriage and the rail. The carriage can be moved along the rail smoothly by the rolling of the rolling members. Generally, the rolling member is supported by the carriage and rotates along a circulation path The carriage is received by the rail so that the carriage can be moved in the axis directions of the rail. However, the carriage cannot be moved in a direction perpendicular to the axis of the rail. Therefore, even if a load is imposed on the carriage in a direction perpendicular to the axis of the rail, the carriage does not totter but can be moved smoothly along the rail.

It is not always the case for the guide rail 63 and the receiving guide 62 to be the rail of a linear guide way and carriage, respectively. But in this case, the guide rail 63 and the receiving guide 62 have cross sections shown in FIG. 22 so that the receiving guide 62 can be moved in a state where the receiving guide 62 is received by the guide rail 63. A lubricant such as grease is supplied to the sliding contact surfaces of the guide rail 63 and the receiving guide 62 so that friction can be reduced.

Thus, in this embodiment, the receiving guide 62 can be moved smoothly in the axis directions of the guide rail 63 (in directions perpendicular to the plane of the paper of FIG. 22) even if a load is imposed in a direction perpendicular to the axis of the guide rail 63 (up, down, left and right directions in FIG. 22). Therefore, the receiving guide 62 can be moved smoothly along the guide rail 63 while the weight of the movable platen 11 or the movable mold 24 mounted on the movable platen 11 is received. In addition, even if a force is imposed on the movable platen 11 in a side direction, the receiving guide 62 does not totter and can be moved smoothly along the guide rail 63.

In this embodiment, the tie bar 12 does not function as a guide member as in the first and second embodiments. Therefore, the movable platen 11 in this embodiment has neither the guide part 45 as in the first embodiment nor the guide part 55 as in the second embodiment. The movable platen 11 in this embodiment has a notch part 58 for permitting the tie bar 12 to enter therein. As long as the notch part 58 does not interfere the tie bar 12, the tie bar 12 may have any kind of configuration or any size. It is not necessary to provide the notch part 58 in a case where the tie bar 12 is located outside of the outer extent of the movable platen 11.

In this embodiment, a force acting on the movable platen 11 at the time of mold closing and mold clamping and the actions of the movable platen 11 are the same as the ones in the first and second embodiments and explanation thereof will be omitted.

Thus, in this embodiment, the receiving guide 62 disposed on the lower end of the movable platen 11 is received by the guide rail 63 and is moved along the guide rail 63. The guide rail 63 is the rail of the linear guide way and the receiving guide 62 is the carriage of the linear guide way. Therefore, the movable platen 11 does not totter back and forth or totter right and left. The movable platen 11 is advanced or retracted smoothly. Therefore, precision regarding the position of the mold at the time of mold closing, mold clamping, or the like, is improved so that it is possible to produce a molded article having high quality.

Furthermore, the tie bar 12 does not function as a guide member in this embodiment. Hence, it is not necessary for the movable platen 11 to have the guide part 45 or the guide part 55 as in the first or second embodiments, for example. Therefore, there is no grease leaking out from a gap between the outer circumferential surface of a tie bar 12 and the inner circumferential surface of a tie bar guide hole, so that grease does not adhere to the mold mounting surface 16 or the movable mold 24 mounted on the mold mounting surface 16.

In addition, weights of the movable platen 11 and the movable mold 24 mounted on the movable platen 11 are not imposed on the tie bar 12. Therefore, the tie bar 12 is not deformed. Hence, the precision regarding the position of the mold is improved so that it is possible to produce the molded article having high quality.

The present invention is not limited to these embodiments, but variations and modifications may be made without departing from the scope of the present invention. For example, although in the above mentioned embodiments, the injection molding machine having the movable platen movable to a horizontal direction is described, the present invention can be applied to an injection molding machine having a movable platen movable in a vertical direction, for example. Furthermore, the present invention can be applied to not only an injection molding machine but also to other kinds of molding machines such as a die-cast machine, an injection sealing press machine or the like.

This patent application is based on Japanese priority patent application No. 2001-212985 filed on Jul. 13, 2001 and Japanese priority patent application No. 2002-050676 filed on Feb. 27, 2002, the entire contents of which are hereby incorporated by reference.

What is claimed is:

1. A molding machine having a movable mold support apparatus on which a movable mold is mounted, the movable mold support apparatus moved by a load that is based on a driving force generated by a driving part and that is transmitted by a toggle mechanism, the movable mold support apparatus comprising:

a mold mounting plate having a mold mounting surface on which the movable mold is mounted;

a first load receiving part and a second load receiving part that receive the load transmitted by the toggle mechanism; and at least one load transmit member having a first end connected to both the first load receiving part and the second load receiving part and a second end connected in a vicinity of a center of a rear surface of the mold mounting plate opposite from the mold mounting surface of the mold mounting plate so that a direction of a force that is caused by the load received by the first load receiving part and the second load receiving part is changed to an advancing direction of the movable mold support apparatus and the force is transmitted to the rear surface of the mold mounting plate, wherein a first distance in a direction perpendicular to a moving direction of the movable mold support apparatus between a center of the mold mounting plate and a position of the second end of the at least one load transmit member is shorter than a second distance in a direction perpendicular to the moving direction of the movable mold support apparatus between the center of the mold mounting plate and a position of the first end of the at least one load transmit member, wherein plate thicknesses in the vicinity of the center of the rear surface of the mold mounting plate are greater than plate thicknesses at any other position on the rear surface of the mold mounting plate and wherein the vicinity of the center does not include the perimeter of the plate.

2. The molding machine as claimed in claim 1, wherein:

the mold mounting plate has a designated plate thickness between the mold mounting surface and the rear surface, and the plate thickness at a position of the second end of the at least one load transmit member on the rear surface is greater than the plate thickness at any other position on the rear surface.

3. The molding machine as claimed in claim 1, further comprising a toggle mechanism connected to the movable mold support apparatus and thereby the first load receiving part and the second load receiving part receive the load.

4. The molding machine as claimed in claim 3, wherein:

the toggle mechanism includes a first pin and a second pin that are connected to the movable mold support apparatus, the first load receiving part has a first pin hole where the first pin is inserted, and the second load receiving part has a second pin hole where the second pin is inserted.

5. The molding machine as claimed in claim 1, wherein:

the at least one load transmit member comprises a first load transmit member and a second load transmit member, and the first load transmit member has a first end connected to the first load receiving part and a second end connected to the rear surface of the mold mounting plate so that the load received by the first load receiving part is transmitted to the rear surface of the mold mounting plate, a first distance in a direction perpendicular to the moving direction of the movable mold support apparatus between the center of the mold mounting plate and a position of the second end of the first load transmit member is shorter than a second distance in a direction perpendicular to the moving direction of the movable mold support apparatus between the center of the mold mounting plate and a position of the first end of the first load transmit member, the second load transmit member has a first end connected to the second load receiving part and a second end connected to the rear surface of the mold mounting plate so that the load received by the second load receiving part is transmitted to the rear surface of the mold mounting plate, and a first distance in a direction perpendicular to the moving direction of the movable mold support apparatus between the center of the mold mounting plate and a position of the second end of the second load transmit member is shorter than a second distance in a direction perpendicular to the moving direction of the movable mold support apparatus between the center of the mold mounting plate and a position of the first end of the second load transmit member.

6. The molding machine as claimed in claim 1, further comprising:

a guide member, wherein the movable mold support apparatus further comprises a guide part receiving the guide member so that the movable mold support apparatus slides along the guide member.

7. The molding machine as claimed in claim 1, wherein:

the movable mold support apparatus further comprises a connecting member having one end connected to the first load receiving part and another end connected to the second load receiving part.

8. The molding machine as claimed in claim 6, wherein:

the movable mold support apparatus further comprises a connecting member having one end connected to the first load receiving part and another end connected to the second load receiving part, and the mold mounting plate, the first load receiving part, the second load receiving part, the at least one load transmit member, the guide part, and the connecting member are formed in a body.

9. The molding machine as claimed in claim 7, wherein:

the connecting member has a pipe configuration.

10. The molding machine as claimed in claim 9, wherein:

the connecting member has a cross section perpendicular to the moving direction of the movable mold support apparatus, having a substantially rectangular configuration.

11. The molding machine as claimed in claim 7, wherein:

the connecting member has an end surface facing the mold mounting plate, the end surface being remote from the rear surface of the mold mounting plate.

12. The molding machine as claimed in claim 6, wherein:

the guide member is a tie bar and the guide part has a guide hole where the tie bar is inserted.

13. The molding machine as claimed in claim 6, wherein:

the guide member is a guide rail and the guide part has a receiving guide receiving the guide rail.

14. The molding machine as claimed in claim 6, wherein:

the guide part has an end surface at a mold mounting surface side of the mold mounting plate, the end surface being remote from a position of the mold mounting surface of the mold mounting plate in a direction of the rear surface of the mold mounting plate.

15. The molding machine as claimed in claim 14, wherein:

the guide part includes a concave part having a bottom surface forming a same surface as the end surface of the guide part and a side surface situated in a direction perpendicular to a direction of the bottom surface.

16. The molding machine as claimed in claim 15, wherein:

a groove part leading to a side surface of the movable mold is formed at the side surface of the concave part.

17. The molding machine as claimed in claim 15, wherein:

a hole part leading from the concave part to the rear surface of the mold mounting plate is formed at the side surface of the concave part.

18. The molding machine as claimed in claim 15, wherein:

the side surface is inclined to an opposite side to the side of the mold mounting surface of the mold mounting plate.

19. The molding machine as claimed in claim 14, wherein:

the end surface of the guide part is situated at a side of the driving part remote from a position of the rear surface of the mold mounting plate, so that a gap is formed between the end surface of the guide part and the rear surface of the mold mounting plate.

20. A molding machine having a movable mold support apparatus including a movable mold mounting plate, the molding machine comprising:
- means for advancing the movable mold mounting plate on which a movable mold is mounted toward a stationary mold forming a cavity therebetween;
- means for injecting a resin into the cavity and filling the cavity with the resin;
- means for cooling and solidifying the resin to obtain a molded article;
- means for retracting the movable mold plate away from the stationary mold; and
- means for projecting an ejector pin into the cavity to eject the molded article;
- wherein the mold mounting plate has a mold mounting surface and a rear surface opposite the mold mounting surface, the movable mold support apparatus including a first load receiving part and a second load receiving part that receive the load transmitted by a toggle mechanism, and at least one load transmit member having a first end connected to both the first load receiving part and the second load receiving part and a second end connected in the vicinity of a center of the rear surface of the mold mounting plate so that a direction of a force that is caused by the load received by the first load receiving part and the second load receiving part is changed to an advancing direction of the movable mold support apparatus and the force is transmitted to the rear surface of the mold mounting plate,
- wherein a first distance perpendicular to a moving direction of the movable mold support apparatus between a center of the mold mounting plate and the position of the second end of the at least one load transmit member is shorter than a second distance perpendicular to the moving direction of the movable mold support apparatus between the center of the mold mounting plate and the position of first end of the at least one load transmit member,
- wherein plate thicknesses in the vicinity of the center of the rear surface of the mold mounting plate are greater than plate thicknesses at any other position on the rear surface of the mold mounting plate and wherein the vicinity of the center does not include the perimeter of the plate.

21. A movable mold support apparatus on which a movable mold is mounted, the movable mold support apparatus moved by a load that is based on a driving force generated by a driving part and that is transmitted by a toggle mechanism, the moveable mold support apparatus comprising:
- a mold mounting plate having a mold mounting surface on which the movable mold is mounted;
- a first load receiving part and a second load receiving part that receive the load transmitted by the toggle mechanism; and
- at least one load transmit member having a first end connected to both the first load receiving part and the second load receiving part and a second end connected to a rear surface of the mold mounting plate opposite from the mold mounting surface of the mold mounting plate so that the load received by the first load receiving part and the second load receiving part is transmitted to the rear surface of the mold mounting plate; and
- a connecting member having a shape expanding outward from where the first load receiving part and the second load receiving part are positioned whereby the first load receiving part and the second load receiving part are connected.

* * * * *